(12) United States Patent
Kellock et al.

(10) Patent No.: US 8,006,186 B2
(45) Date of Patent: *Aug. 23, 2011

(54) SYSTEM AND METHOD FOR MEDIA PRODUCTION

(75) Inventors: Peter Rowan Kellock, Singapore (SG); Edward James Altman, Singapore (SG)

(73) Assignee: Muvee Technologies Pte. Ltd., Singapore (SG)

( * ) Notice: Subject to any disclaimer, the term of this patent is extended or adjusted under 35 U.S.C. 154(b) by 2560 days.

This patent is subject to a terminal disclaimer.

(21) Appl. No.: 10/451,041

(22) PCT Filed: Dec. 22, 2000

(86) PCT No.: PCT/SG00/00197
§ 371 (c)(1),
(2), (4) Date: Jun. 18, 2003

(87) PCT Pub. No.: WO02/052565
PCT Pub. Date: Jul. 4, 2002

(65) Prior Publication Data
US 2004/0027369 A1 Feb. 12, 2004

(51) Int. Cl.
*G06F 3/16* (2006.01)
(52) U.S. Cl. ......... 715/728; 715/721; 715/723; 715/726
(58) Field of Classification Search .................. 715/201, 715/206, 835, 840, 854, 716–732
See application file for complete search history.

(56) References Cited

U.S. PATENT DOCUMENTS

| | | | |
|---|---|---|---|
| 5,262,865 A | 11/1993 | Herz | |
| 5,267,034 A | 11/1993 | Miyatake et al. | |
| 5,286,908 A | 2/1994 | Jungleib | |
| 5,303,041 A | 4/1994 | Nishimura | |
| 5,309,228 A | 5/1994 | Nakamura | |
| 5,339,393 A * | 8/1994 | Duffy et al. | 715/723 |
| 5,537,530 A | 7/1996 | Edgar et al. | |
| 5,541,662 A * | 7/1996 | Adams et al. | 348/460 |
| 5,623,424 A * | 4/1997 | Azadegan et al. | 708/203 |
| 5,635,982 A * | 6/1997 | Zhang et al. | 348/231.99 |

(Continued)

FOREIGN PATENT DOCUMENTS

AU 200025214 B2 10/2000

(Continued)

OTHER PUBLICATIONS http://vaio-online.sony.com/sg/vaio/Press/pr4_content.html; *VAIO Online Singapore, What's New*, "Press Release"; Oct. 24, 2000.

(Continued)

*Primary Examiner* — Ba Huynh
(74) *Attorney, Agent, or Firm* — Merchant & Gould P.C.

(57) ABSTRACT

An editing system is proposed for automatically, or semi-automatically, editing input data to generate output production. The input material is annotated by, or analyzed to derive, a set of media descriptors which describe the input material and which are derived from the input material. The style of editing is controlled using style data which is optionally derived from a user. The input material may include any or more of motion video, still images, music, speech, sound effects, animated graphics and text. The style data and the descriptors are used to generate a set of operations which, when carried out on the input data, generate an edited output production.

43 Claims, 17 Drawing Sheets

U.S. PATENT DOCUMENTS

| | | | |
|---|---|---|---|
| 5,655,117 A * | 8/1997 | Goldberg et al. | 1/1 |
| 5,684,715 A * | 11/1997 | Palmer | 348/473 |
| 5,693,902 A | 12/1997 | Hufford et al. | |
| 5,758,180 A * | 5/1998 | Duffy et al. | 710/122 |
| 5,794,178 A * | 8/1998 | Caid et al. | 704/9 |
| 5,801,685 A | 9/1998 | Miller et al. | |
| 5,805,733 A * | 9/1998 | Wang et al. | 382/232 |
| 5,826,102 A * | 10/1998 | Escobar et al. | 715/202 |
| 5,852,435 A * | 12/1998 | Vigneaux et al. | 345/428 |
| 5,861,880 A | 1/1999 | Shimizu et al. | |
| 5,877,445 A | 3/1999 | Hufford et al. | |
| 5,937,136 A * | 8/1999 | Sato | 386/52 |
| 5,956,453 A * | 9/1999 | Yaegashi et al. | 386/52 |
| 5,969,716 A * | 10/1999 | Davis et al. | 715/726 |
| 5,973,679 A * | 10/1999 | Abbott et al. | 715/203 |
| 5,982,447 A * | 11/1999 | Nakamura | 348/515 |
| 6,026,389 A | 2/2000 | Nakajima et al. | |
| 6,032,156 A * | 2/2000 | Marcus | 1/1 |
| 6,070,167 A * | 5/2000 | Qian et al. | 1/1 |
| 6,118,444 A * | 9/2000 | Garmon et al. | 715/723 |
| 6,137,483 A | 10/2000 | Kiyono et al. | |
| 6,137,945 A * | 10/2000 | McGrath | 386/52 |
| 6,138,130 A * | 10/2000 | Adler et al. | 715/210 |
| 6,141,001 A * | 10/2000 | Baleh | 715/203 |
| 6,163,510 A | 12/2000 | Lee et al. | |
| 6,173,275 B1 * | 1/2001 | Caid et al. | 706/14 |
| 6,195,458 B1 * | 2/2001 | Warnick et al. | 382/173 |
| 6,204,840 B1 * | 3/2001 | Petelycky et al. | 715/202 |
| 6,226,608 B1 * | 5/2001 | Fielder et al. | 704/229 |
| 6,243,087 B1 * | 6/2001 | Davis et al. | 715/723 |
| 6,243,713 B1 * | 6/2001 | Nelson et al. | 1/1 |
| 6,262,723 B1 * | 7/2001 | Matsuzawa et al. | 715/723 |
| 6,263,149 B1 * | 7/2001 | Persoon | 386/52 |
| 6,292,620 B1 * | 9/2001 | Ohmori et al. | 386/55 |
| 6,310,839 B1 | 10/2001 | Lee et al. | |
| 6,320,598 B2 * | 11/2001 | Davis et al. | 345/648 |
| 6,330,004 B1 * | 12/2001 | Matsuzawa et al. | 715/723 |
| 6,353,170 B1 | 3/2002 | Eyzaguirre et al. | |
| 6,360,234 B2 * | 3/2002 | Jain et al. | 715/201 |
| 6,363,380 B1 * | 3/2002 | Dimitrova | 707/740 |
| 6,374,260 B1 * | 4/2002 | Hoffert et al. | 1/1 |
| 6,377,519 B1 | 4/2002 | Lee et al. | |
| 6,392,133 B1 * | 5/2002 | Georges | 84/609 |
| 6,449,422 B1 * | 9/2002 | Ebisawa | 386/52 |
| 6,452,612 B1 * | 9/2002 | Holtz et al. | 715/723 |
| 6,452,875 B1 * | 9/2002 | Lee et al. | 369/30.04 |
| 6,457,027 B1 * | 9/2002 | Orr | 715/255 |
| 6,463,444 B1 * | 10/2002 | Jain et al. | 1/1 |
| 6,466,239 B2 * | 10/2002 | Ishikawa | 715/850 |
| 6,469,749 B1 * | 10/2002 | Dimitrova et al. | 348/722 |
| 6,490,370 B1 * | 12/2002 | Krasinski et al. | 382/195 |
| 6,492,998 B1 * | 12/2002 | Kim et al. | 715/723 |
| 6,542,869 B1 | 4/2003 | Foote | |
| 6,549,643 B1 | 4/2003 | Toklu et al. | |
| 6,564,263 B1 * | 5/2003 | Bergman et al. | 709/231 |
| 6,567,980 B1 * | 5/2003 | Jain et al. | 725/61 |
| 6,626,954 B1 * | 9/2003 | Kamachi et al. | 715/236 |
| 6,628,303 B1 * | 9/2003 | Foreman et al. | 715/723 |
| 6,665,318 B1 * | 12/2003 | Tomokane et al. | 370/535 |
| 6,686,970 B1 | 2/2004 | Windle | |
| 6,697,523 B1 | 2/2004 | Divakaran et al. | |
| 6,697,564 B1 * | 2/2004 | Toklu et al. | 386/285 |
| 6,715,126 B1 * | 3/2004 | Chang et al. | 715/201 |
| 6,721,454 B1 * | 4/2004 | Qian et al. | 382/224 |
| 6,757,027 B1 | 6/2004 | Edwards et al. | |
| 6,760,916 B2 * | 7/2004 | Holtz et al. | 725/34 |
| 6,774,917 B1 * | 8/2004 | Foote et al. | 715/700 |
| 6,873,740 B1 * | 3/2005 | Devillers et al. | 382/243 |
| 6,877,134 B1 * | 4/2005 | Fuller et al. | 715/202 |
| 6,898,291 B2 * | 5/2005 | Gibson | 381/119 |
| 6,898,759 B1 * | 5/2005 | Terada et al. | 715/202 |
| 6,904,227 B1 * | 6/2005 | Yamamoto et al. | 386/52 |
| 6,912,327 B1 * | 6/2005 | Hori et al. | 382/305 |
| 6,912,726 B1 * | 6/2005 | Chen et al. | 725/113 |
| 6,934,906 B1 * | 8/2005 | Cheok | 715/204 |
| 7,020,888 B2 * | 3/2006 | Reynolds et al. | 725/34 |
| 7,024,677 B1 * | 4/2006 | Snyder et al. | 725/86 |
| 7,093,191 B1 * | 8/2006 | Jain et al. | 715/201 |
| 7,356,830 B1 * | 4/2008 | Dimitrova | 725/51 |
| 7,362,946 B1 * | 4/2008 | Kowald | 386/52 |
| 7,702,014 B1 * | 4/2010 | Kellock et al. | 375/240.08 |
| 7,725,812 B1 * | 5/2010 | Balkus et al. | 715/202 |
| 2001/0009423 A1 * | 7/2001 | Davis et al. | 345/723 |
| 2001/0012444 A1 * | 8/2001 | Ito et al. | 386/111 |
| 2002/0032697 A1 * | 3/2002 | French et al. | 707/500.1 |
| 2002/0053078 A1 * | 5/2002 | Holtz et al. | 725/14 |
| 2002/0069218 A1 * | 6/2002 | Sull et al. | 707/501.1 |
| 2003/0233929 A1 * | 12/2003 | Agnihotri | 84/609 |
| 2004/0125124 A1 * | 7/2004 | Kim et al. | 345/716 |
| 2006/0029368 A1 * | 2/2006 | Harville | 386/69 |
| 2008/0016114 A1 * | 1/2008 | Beauregard et al. | 707/104.1 |

FOREIGN PATENT DOCUMENTS

| | | |
|---|---|---|
| EP | 1 058 453 A1 | 12/2000 |
| JP | 06-068168 | 3/1994 |
| JP | 2000-268540 | 9/2000 |
| WO | 00/39997 | 7/2000 |

OTHER PUBLICATIONS

Tsekeridou, Sofia and Ioannis Pitas, "Audio-Visual Content Analysis for Content-Based Video Indexing".

Effelsberg, Prof. Dr. W., "Automatische Inhaltsanalyse von digitalen Videos, 4.5.6".

Lienhart, Rainer, Silvia Pfeiffer and Wolfgang Effelsberg, "Scene Determination based on Video and Audio Features".

Parkes, Alan P., "Temporal Viewpoints for Video-Based Question Answering", 1993 (presented as Culture, Technology, Interpretation: the Challenge of Multimedia, Trinity College, Dublin, Ireland).

Liu, Zhu, Yao Wang and Tsuhan Chen, "Audio Feature Extraction and Analysis for Scene Segmentation and Classification".

Chua, Tat-Seng and Li-Qun Ruan, "A Video Retrieval and Sequencing System".

Takahasi, Shogo, Kenji Suzuki, Hideyuki Sawada and Shuji Hashimoto, "Music Creation from Moving Image and Environmental Sound".

Rowe, Robert and Eric L. Singer, "Two Highly Integrated Real-Time Music and Graphics Performance Systems".

Ahanger, G. and T.D.C. Little, Automatic Composition Techniques for Video Production.

Pfeiffer, S., R. Lienhart, S. Fischer and W. Effelsberg, "Abstracting Digital Movies Automatically".

Nack, Frank-Michael, Auteur: "The Application of Video Semantics and Theme Representation for Automated Film Editing", Aug. 1996.

* cited by examiner

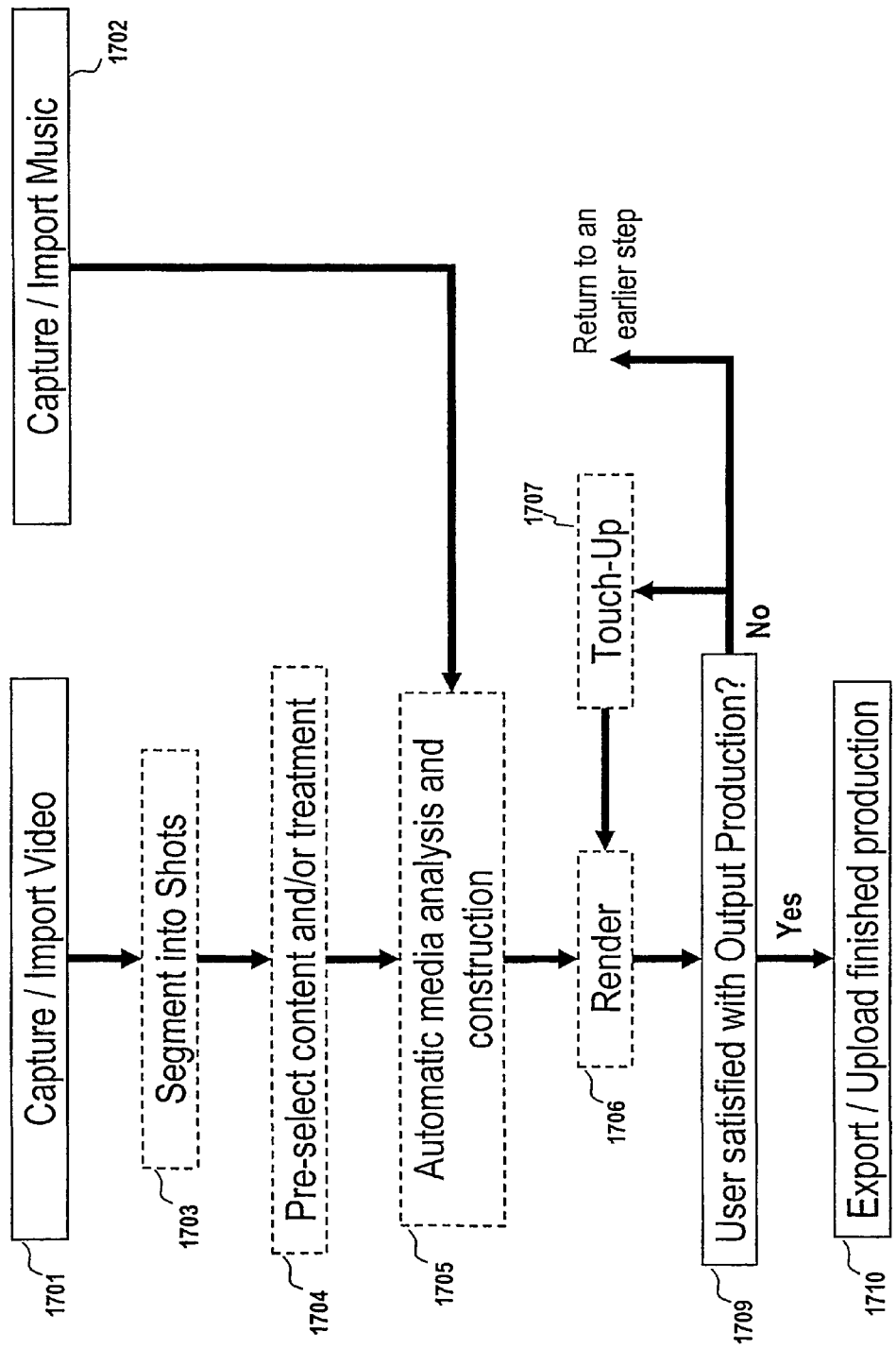

SYSTEM AND METHOD FOR MEDIA PRODUCTION

FIELD OF THE INVENTION

The invention relates generally to computer generation of media productions. In particular, the invention relates to automated or semi-automated editing of productions including any one or more of the following media: motion video, still images, music, speech, sound effects, animated graphics and text.

BACKGROUND OF THE INVENTION

Today, analogue media are gradually being replaced by digital media. In the case of audio this transition has already largely taken place, and it is well underway for image, video, graphics animation and other media. As these media become digital and the capability/cost ratio of computing resources continues to increase, new users and markets for digital media production are opening up. Of particular relevance to this invention are emerging markets for casual media production and especially casual video production, i.e. cases where the high cost of professional video production would preclude its use and where, until recently, the cost of the necessary equipment was too high. These include home video production (e.g. of holidays, weddings, etc), some informal corporate uses (e.g. internal communications and team-building), use by societies and other organizations, etc.

The concept of casual or "desktop" video production has existed for about a decade, but widespread adoption has been held back by a number of problems. These include:
1. Problems of technical infrastructure: inconvenience and loss of quality when digitizing video from a camera, limited hard disk space, insufficient processing power, etc.
2. The lack of convenient, low-cost distribution mechanisms: until recently the only widespread formats have been videotapes, but the cost and time involved in duplication and distribution preclude many potential applications.
3. The time and expertise required to make acceptable-quality productions, particularly at the stage of editing and "post-production".

The first and second of these problems are today disappearing thanks to technologies such as DV cameras, the IEEE 1394 ("Firewire") interface and video distribution on the world-wide web.

This invention attempts to address the third problem, allowing automated or semi-automated editing of digital media, particularly video.

Today, the main tool used for editing video is the "Non-Linear video Editor" or NLE. These are computer programs which adopt many paradigms from conventional editing methods such as film cutting and linear dub-editing using video tape machines. They employ manual methods of editing which are well suited to scenarios where the user is experienced and the desired result is a high-quality video production. There are many products of this type including Premiere from Adobe Inc., and iMovie from Apple Inc.

The NLE is a considerable advance on earlier technology, yet there remain many scenarios in which the user is not a media professional, in which professional quality is not essential, or in which it is necessary to edit material very quickly. Even NLEs which claim to be aimed at non-professionals have a significant learning curve and require substantial time to produce acceptable productions. It is generally accepted that in typical cases a user will have to spend one hour in order to create one minute of output video, in other words a ratio of 60:1 of production time to playback duration. It is one of the goals of the current invention to reduce this ratio dramatically through automation, to the point where in some cases acceptable results can be produced without any user intervention.

There also exist several tools which allow a user to create productions involving the real-time display of images and text synchronized to an audio track. These include animation tools (e.g. Flash from Macromedia Inc.), slideshow tools (e.g. PowerPoint from Microsoft Inc.) and authoring tools for streaming media (e.g. RealPlayer from Real Networks Inc.). But once again, users often find that they need to spend hours in order to produce a simple production lasting a few minutes.

SUMMARY OF THE INVENTION

This invention aims to provide new and useful apparatus and methods for generating media productions from input media material.

In general terms, the invention proposes that input material is edited to construct an output production. The process includes deriving a set of media descriptors which describe the input material, either by analysis or from an external source, or a combination of the two. This is followed by a computer-based construction process which includes making edit decisions based on (i) the set of media descriptors, and (ii) style data, such as user-generated style data, for defining the editing style.

The input material may include any one or more of motion video, still images, music, speech, sound effects, animated graphics and text.

The set of media descriptors may be supplemented by descriptors which are pre-generated (e.g. outside the apparatus of the invention) and imported, for example together with the input material.

The style data may be generated by a process which includes either or both of deterministic and stochastic (probabilistic) operations.

The editing may include any one or more of the following processes applied to the input material: segmentation (of video/audio), selective inclusion, sequencing, transformation and combination. These processes may optionally be supplemented with user intervention. This is supported at two stages: a pre-selection stage prior to the automatic construction process and a touch-up stage after construction.

A particularly preferred feature of the invention is the ability to produce music-based productions in which the input material consists of a) motion video material and/or a set of images, and b) recorded music. The system analyses both the video/images and the music to create media description data for both, then uses this information to create the output production, influenced or determined by the structure of the music.

Typical applications of the current invention include the production of video and other time-based media for home, corporate and hobbyist environments, production of slideshows synchronized to music, production of rich-media electronic greeting cards, production of media for world-wide-websites, production of rich-media online catalogues, production of rich-media online content related to consumer-to-consumer sales applications such as online auctions and classified advertisements, some professional video applications such as the production of karaoke videos, etc.

The invention, which includes both method and apparatus aspects (i.e. apparatus comprising respective means to perform the steps of the methods), may be embodied within various kinds of hardware including general-purpose computers, personal digital assistants, dedicated video-editing boxes, set-top boxes, digital video recorders, televisions, games consoles, digital still cameras, and digital video cameras.

BRIEF DESCRIPTION OF THE DRAWINGS

Embodiments of the invention are described hereinafter, for the sake of example only, with reference to the drawings, in which:

FIG. 17 shows the typical workflow for a user creating a video production using the embodiment of FIG. 1.

DETAILED DESCRIPTION OF THE EMBODIMENTS

Figure 1:
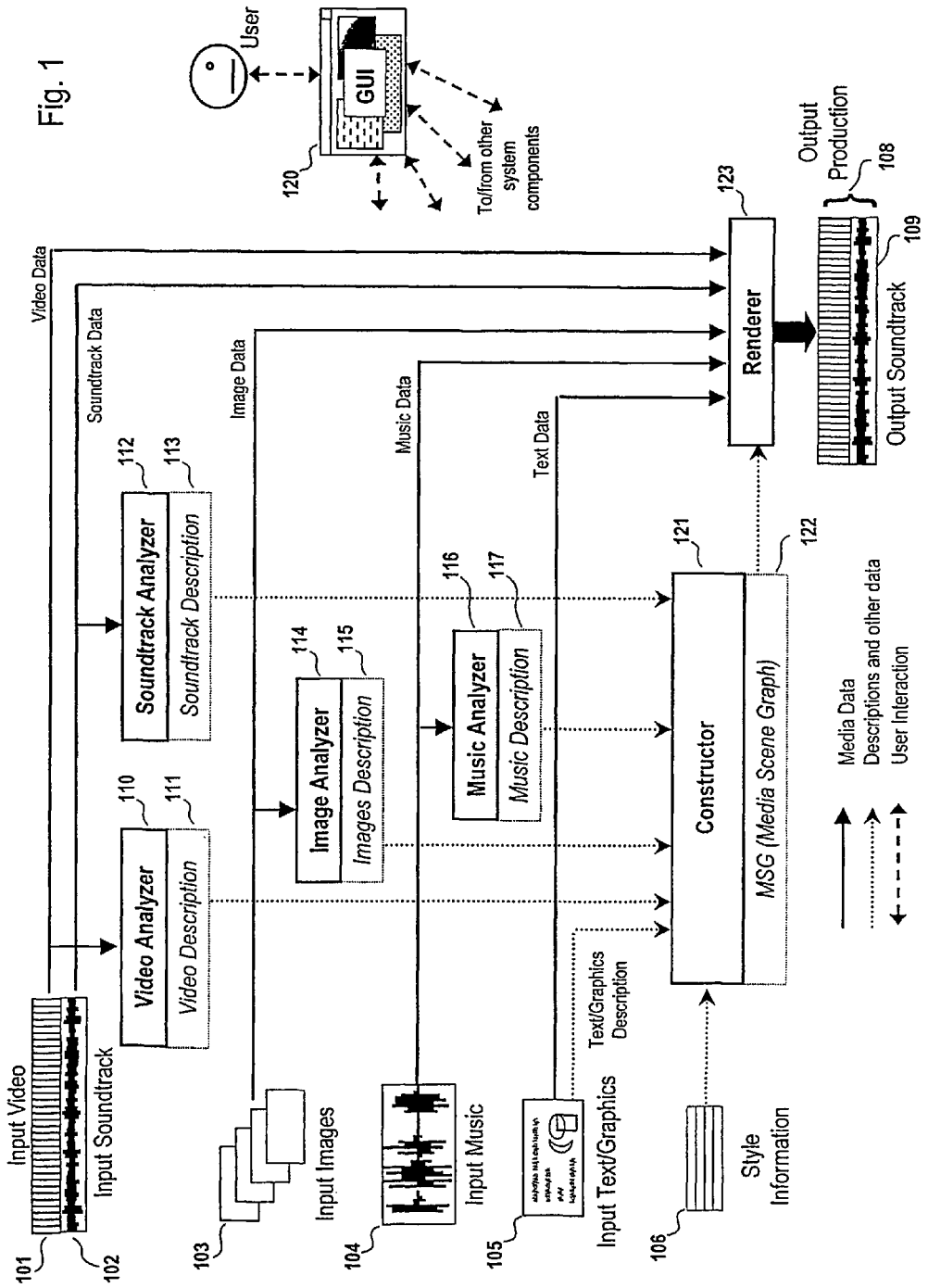
FIG. 1 illustrates an embodiment of the invention comprising a set of interconnected functional modules.

FIG. 1 shows the overall structure of an embodiment of the invention.

Referring to FIG. 1, the material input to the system includes one or more of the following:

"input video" [101], i.e. motion video such as a digital video stream or one or more digital video files. Typically this is unedited "raw footage" such as video captured from a camera or camcorder. Optionally it may include an input soundtrack [102].

"input images" [103], i.e. still images such as digital image files. These may be used instead of motion video, or in addition to motion video.

"input music" [104] in a form such as a digital audio stream or one or more digital audio files. In the embodiment music provides the timing and framework for the output production: the input visual material is edited in ways which relate to the structure of the music in order to produce a music-based production.

input text and/or graphics [105] typically used for titles, credits, subtitles, etc.

"style information" [106], i.e. data or logic used by the system to control or influence aspects of the automatic construction process—in other words the "editing style". The user may select from a number of predefined styles, and/or have access to individual style parameters. Depending on the embodiment, styles may be external to the system or form part of the system.

In this document the term "input material" is used to mean one or more pieces of media which are presented as input to the system. Supported media types include motion video, still images, music, speech, sound effects, static or animated graphics and static or animated text. The term "input visual material" refers to input material of any visual type including video, images, animation, graphics or text.

Output

Referring to FIG. 1, the output production [108] created by the system is a piece of time-based media such as a video, animation, or timed sequence of images; this may include an associated soundtrack, the output soundtrack [109], consisting of music, speech and/or other sounds. The output production is formed from some or all of the input material which has been subjected to one or more of the following processes by the system:

"Segmentation". That is, input video is segmented according to visual or sonic characteristics, for example into shots, parts of shots, segments that contain a particular voice or background sound, etc. A shot is a single contiguous piece of video which does not have breaks or cuts, such as a segment of video which was recorded without pausing or stopping a video camera.

"Selective inclusion". That is, elements of the input material such as segments of video, music or soundtrack, selected images, or regions within images or video frames are included in the output production, while others are excluded. Typically—as in conventional media production—a large fraction is excluded.

"Sequencing". Elements of the input material may be sequenced so that the time-ordering of the elements comprising the output production corresponds to the time ordering of those elements in the input material, or they may be sequenced according to some other criterion such as descriptor similarity.

"Transformation". Elements of the input material may be transformed, e.g. by a process including any of the "special effects" well-known in the prior art, including transformations of color (e.g. monochrome and flash effects), speed (e.g. slow-motion), size (e.g. artificial zoom), position (e.g. artificial pan), shape (e.g. warping), etc.

"Combination". Elements of the input material are combined both simultaneously and sequentially. For example, images and video segments from the input material may be presented simultaneously with input music, and input text/graphics may be overlaid onto the video. Images and segments of video may be concatenated with overlaps allowing the use of transitions such as dissolves and wipes well-known in the art. Segments of the input soundtrack may be mixed with segments of the input music. Multiple images and/or video segments can be presented simultaneously in different regions of the frame area of the output production or mixed over each other to create composite images ("mixage").

The output production may also include material generated by the system without reference to the input material, such as colors and textures used as backgrounds, static and animated graphical elements, etc.

Analysis and Description Components

Referring again to FIG. 1, the embodiment has the following components concerned with analysis and description of the input material.

The video analyzer [110]. This analyses the input video to produce a video description [111] containing one or more descriptors. The video analyzer applies signal analysis techniques or other kinds of processing to individual frames or multiple frames of the input video in order to create the descriptors. Typical descriptors are measures of brightness or color such as color histograms, measures of texture, measures of shape, measures of motion activity, descriptors identifying the times of shot and other segment boundaries in the input video, categorical likelihood measures (e.g. probability that a segment of the input video contains a human face, probability that it is a natural scene, etc), measures of the rate of change and statistical properties of other descriptors, descriptors derived by combining two or more other descriptors, etc. Many such descriptors and techniques are well known to those skilled in the art and new ones are constantly being defined.

The soundtrack analyzer [112]. This analyses the input soundtrack of the input video to produce a soundtrack description [113] containing one or more descriptors. The soundtrack analyzer applies signal analysis techniques or other kinds of processing to the input soundtrack in order to create the descriptors. Typical descriptors are measures of audio intensity or loudness, measures of frequency content such as spectral centroid, brightness and sharpness, categorical likelihood measures (e.g. probability that a segment of the input soundtrack contains a human voice), measures of the rate of change and statistical properties of other descriptors, descriptors derived by combining two or more other descriptors, etc. Many such descriptors and techniques are well known to those skilled in the art and new ones are constantly being defined.

The image analyzer [114]. This analyses the input images to produce an images description [115] containing one or more descriptors. The image analyzer applies signal analysis techniques or other kinds of processing to individual images or groups of images in order to create the descriptors. Typical descriptors are measures of brightness or color such as color histograms, measures of texture, measures of shape, categorical likelihood measures (e.g. probability that an image contains a human face, probability that it is a natural scene, etc), measures of the statistical properties of other descriptors, descriptors derived by combining two or more other descriptors, etc. Many such descriptors and techniques are well known to those skilled in the art and new ones are constantly being defined.

The music analyzer [116]. This analyses the input music to produce a music description [117] containing one or more descriptors. The music analyzer applies signal analysis techniques or other kinds of processing to segments of the music in order to create the descriptors. Typical descriptors are measures of intensity or loudness, measures of beat strength, musical rhythm and tempo, measures of frequency content such as spectral centroid, brightness and sharpness, measures of musical pitch content such as root note pitch, consonance, musical key membership and chordal content, measures of the rate of change and statistical properties of other descriptors, descriptors derived by combining two or more other descriptors, etc. Many such descriptors and techniques are well known to those skilled in the art and new ones are constantly being defined. The music analyzer may also provide a representation of the structure of the input music at various timescales, from the "macro" timescale of major sections such as introduction, verse, chorus, etc to the "micro" timescale of bars, beats and sub-beats. Means of representing musical structure are well-known to musicians, music theorists, and others, and many techniques for extracting this type of information by signal analysis are known in the field of computer music analysis.

In this document, the analyzer components described above [1110, 112, 114 and 116] are collectively known as the "media analyzers", and the descriptions [111, 113, 115 and 117] are known as "media descriptions".

Media descriptions can also be stored for later use, for example by saving the description data to disk or non-volatile memory. (For simplicity, this is not shown in FIG. 1.) This allows the user to construct different output productions from the input material without the need to re-analyze material, thus reducing the processing time needed to view multiple alternative productions.

In addition to, or alternatively to, signal analysis, descriptors may be imported into the system and stored in the media descriptions. (For simplicity, this is not shown in FIG. 1). Such descriptors have been created at some earlier time and are typically embedded within, or in some way linked to, the input material. Such descriptors include video descriptors generated by camera instrumentation such as time-of-shooting, focal distance, geographical location generated by satellite positioning systems (e.g. GPS) attached to the camera, measures of ambient light level during shooting, etc. They may also include music descriptors generated during the music production process, such as elements extracted or derived from music sequencers or MIDI (Musical Instrument Digital Interface) data. Music sequencers and MIDI are widely used in music production and can be used to create descriptive information which is difficult to derive from the music audio signal after it is mixed down: for example information about musical pitch, instrumentation, music repetition structures, etc.

Imported descriptors can also originate from a manual or semi-automatic process, for example in which a user annotates the input music, video or images before importing the input material plus its descriptions into the system. Such descriptors may be closely related to descriptors created by signal analysis. For example it is sometimes desirable to create descriptors using the system, correct or refine these descriptions manually, and then use the refined description as the basis for processing by the other modules of the system.

Imported descriptors may be stored directly in the media descriptions, or they may require further analysis, conversion or interpretation after they are imported; this function is also provided by the media analyzers.

Other Components

Referring again to FIG. 1, the system further includes the following components:

The graphical user interface or GUI [120]. This acts as intermediary between the user and the system, communicating with several of the other modules of the system. User interaction typically includes the following capabilities:

Overall control, such as selection of files containing the input material and selection of a destination file for the output production. Other aspects of control include the initiation of analysis and construction tasks.

User interaction with the style information—for example the selection of predefined styles, or creation of new styles, or alteration of existing styles.

Manual intervention, both at a pre-selection stage and at a touch-up stage.

Features and variants of the GUI are further described below.

The constructor [121]. This contains much of the core logic of the system. It receives as input the one or more media descriptions and receives (or contains within it) the style information [105]. Its main function is to use these inputs to make all the edit decisions necessary to specify the form of the output production [108] and to store this specification of the output production in a structure called the "media scene graph" or MSG [122]. The MSG can be regarded as a complete representation of the form of the output production or as a complete set of instructions for making the output production; this includes the source and timing of all elements of the input material (such as segments of video, music or soundtrack, selected images, or regions within images or video frames) which are used in the output production, the types of transformations and special effects applied to these elements, the types of transition effect used in the output production, the source and presentation of all overlays such as text and graphics used in the Output production, the timing of all of these elements, etc. The MSG controls the renderer (see just below) and also plays an important role during manual touch-up: it is the primary underlying data structure which the user interacts with at this stage, being a full representation of the current production at all times and being updated to reflect changes made by the user.

The MSG can optionally be saved and reloaded for later use, allowing progressive touch-up of the final production. Also, parts of the MSG (for example temporal regions or certain types of edit information) can be "locked" and others "unlocked". This allows an output production to be made by progressive refinement: the user instructs the system to run the constructor (and renderer), views the resulting output production, locks regions or features that he/she likes, runs the constructor (and renderer) again to replace the unlocked regions/features, views the altered output production, locks another set of regions/features, and so on.

The logic of the constructor and the structure of the MSG are described in detail below.

The renderer [123]. This produces an output production according to the information in the MSG. In other words, it interprets the MSG data as instructions and, according to these instructions, selects elements of the input material, applies processes such as sequencing, transformation, combination and concatenation to the selections, and transfers or copies them to an output such as a file or an audiovisual monitor. The result is the output production. The kind of operations performed by the renderer are generally well-known in the art and do not require further explanation, being found in many non-linear video editors and generally supported by standard video architectures such as DirectShow from Microsoft Inc. and QuickTime from Apple Inc. The renderer may include a compression module, compressing the output production using techniques such as digital video compression and digital audio compression which are well-know in the art, for example as defined by the MPEG (Motion Picture Experts Group) standards body.

Distributed Production

In general in this document, the invention is described as a single system including the media analyzers, the constructor and the renderer. However it can also be a distributed system in which each of these modules is a separate program, potentially run at different times at different locations by different parties. It has already been mentioned that media descriptions can be stored and imported when needed by the constructor. Such media descriptions can be created by media analyzer modules invoked at any earlier time at any location by any party.

Likewise, because the MSG is a complete representation of the form of the output production or a complete set of instructions for making the output production, the renderer can be run separately from the constructor or analyzers. It can even be run in real-time while the output production is viewed, in other words creating the output production on the fly, in which case the renderer is in effect a sophisticated playback engine. All that is required to make this possible is that the MSG and the input material are available at the time of rendering.

For example, in an application where two parties share access to a common body of input material, or have two identical copies of the input material, one party can run the analyzers and constructor in order to create an MSG, then send this MSG to the second party whereupon the second party runs the renderer to create the output production "on the fly" as she/he views it. In another example, a community of people can first acquire copies of a common body of input material and associated pre-created media descriptions, then individually produce output productions which they share with each other simply by transmitting different MSG's. The advantage of this is that each MSG is a small amount of data compared to typical media data and can therefore be transmitted quickly and easily. The common body of media is suited to distribution on a medium such as CD-ROM or DVD; the community of people owning the CD-ROM/DVD can share their productions by, for example, forwarding MSG's as email attachments.

The process of automatic construction will now be described in detail with reference to FIGS. 2 to 8.

Video Editing Example

Figure 2:
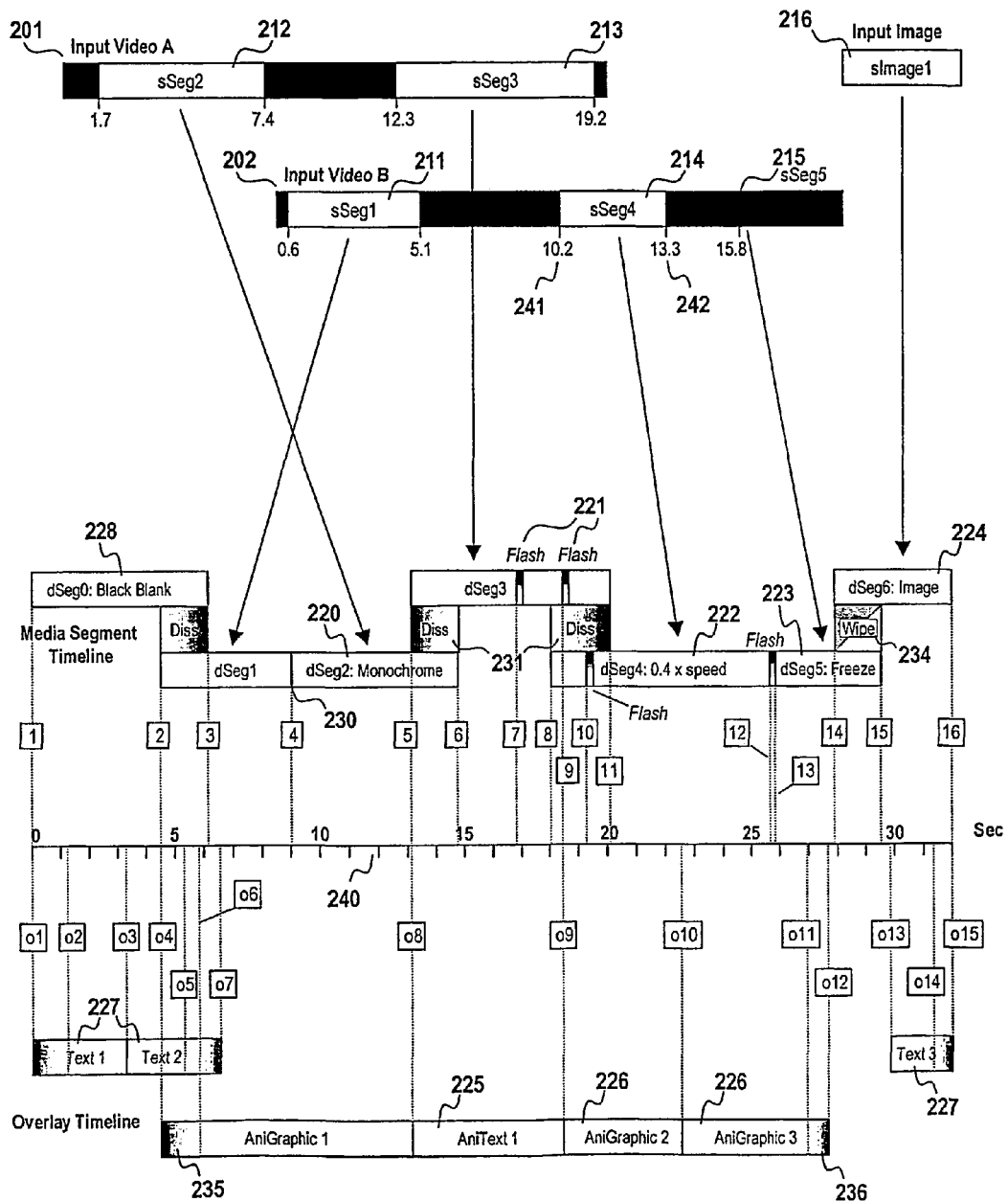
FIG. 2 illustrates an example of the operation of the embodiment of FIG. 1.

FIG. 2 shows a typical example in which an output production is created from input material by the application of the construction processes listed above: segmentation, selective inclusion, sequencing, transformation and combination. (This figure is a purely visual example, not showing audio.) In traditional linear and non-linear editing these processes are well-known and applied manually. The main purpose of the current invention is to automate them fully or partially. Before describing how the invention achieves such automation, it is useful to consider some of the examples illustrated in FIG. 2:

Segmentation. Two pieces of input video [201, 202] such as digital video files are segmented to produce five "source" segments, sSeg1 to sSeg5 [211, 212, 213, 214, 215]. One of these, sSeg5 [215] is a segment consisting of a single frame.

Selective inclusion. The five source segments [211-215] are included in the output video production while the remaining material from the input video is not used. A single image, sImage1 [216] is also included.

Sequencing. In this example, the order of the segments comprising the output production is not the same as their order in the input material. For example, in the output production, the first two segments from input video B [211, 214] are interspersed by two segments from input video A [212, 213].

Transformation. Several examples of transformation are shown in FIG. 2. The segment sSeg2 is transformed to monochrome by removing its color information to preserve only its luminosity [220]. sSeg3 is transformed by adding flash effects, i.e. in which the luminosity of regions within one or more frames is increased [221]. sSeg4 is subjected to a time transformation, slowing it to 0.4× its original speed by, for example, creating new interpolated frames between the original frames [222]. sSeg5 is subjected to a more extreme time transformation, in which its single frame is copied to several successive frames to create a freeze [223]. sImage1 is also copied to a number of successive frames so that it forms a segment of the output production [224]. Many other such video transformations are well-known in the art. In addition, text and graphic elements used as overlays may be transformed in various ways: for example animated so that they change position, size, shape, color, etc as time progresses, possibly in response to parameters of music as described below. (These are indicated on FIG. 2 as "AniText" [225] and "AniGraphic" [226].) Text and graphic elements may also be faded in [235] and out [236].

Combination. FIG. 2 also illustrates several ways of combining the input material. The transformed segments dSeg1 and dSeg2 are concatenated to form a cut or "butt-edit" [230]. Other segments are concatenated with partial overlaps, allowing the use of dissolves [231], wipes [234] and other transition effects well-known in the art. Text and graphic elements, both static [227] and animated [225, 226] are overlaid on the video to form the final production.

FIG. 2 also contains a simple example of material generated by the system without using the input material: a black background [228] on top of which text [227] is overlaid.

All the above involve timing references relative to the output production; these are shown as vertical dotted lines projected onto the timeline [240] of the output production. Segments of input video involve an additional set of timing references relative to their input video source file, for example the start time [241] and end time [242] of sSeg4.

In conventional NLEs, the user makes all decisions about which of these processes to apply and where to apply them. The current invention creates an output production automatically by making the decisions itself and invoking processes such as those above accordingly. The constructor [121] is the heart of the system and decides which processes to apply and where to apply them, while the renderer [123] performs the actual processing.

The Construction Process

Figure 3:
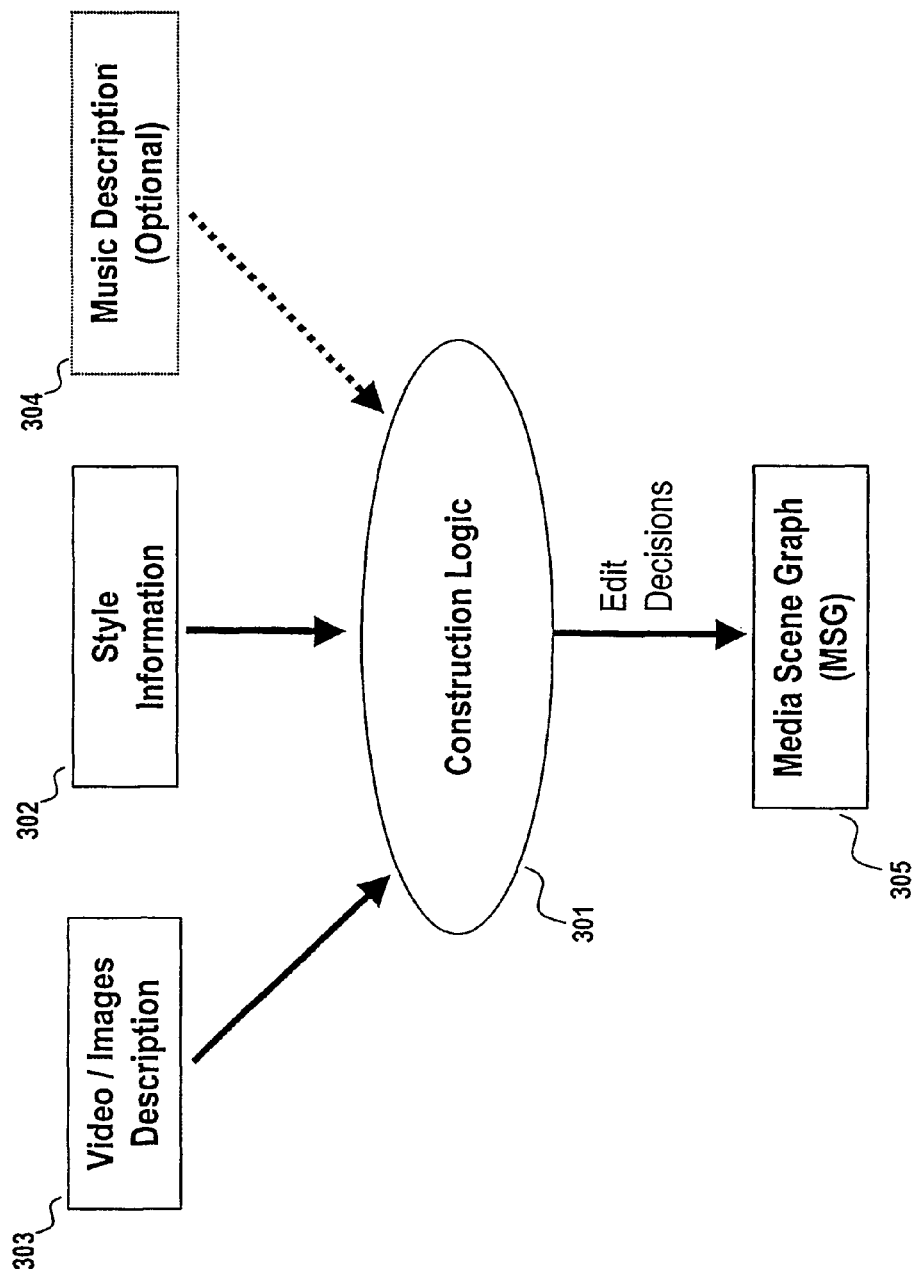
FIG. 3 illustrates schematically an operating principle of the embodiment of FIG. 1.

FIG. 3 shows a central construction principle of the invention. Construction logic [301] in the constructor takes style information [302] and media descriptions (descriptions of video and/or images [303] and optionally a music description [304]) as input, using information from both to make a set of edit decisions which are stored in the MSG [305] and which specify the output production. The style information may be considered a set of preferences, suggestions or requests to the construction logic. The way in which the construction logic acts upon these preferences depends on the values of data in the media descriptions, so that the specific set of edit decisions is dependent both upon the style information and upon the nature of the input material.

Some examples of this process will now be presented in more detail, starting from the nature of styles.

Styles

Styles may be defined by data or logic or some mix of the two. For example, the style information [302] of FIG. 3 could be a set of manually-defined parameters which are imported by the construction logic, or they could be a set of parameters generated by programmed style logic such as a style class in an object-oriented programming implementation. This distinction is not very important here and the following discussion refers to both interchangeably.

Style information is created by a style designer, for example by a process of manually defining a set of values for parameters, and the aim of the style designer is to create styles which will cause the system to generate high-quality output productions. The information comprising styles may be categorized according to which part of the construction process they affect, using a similar categorization to that used above. For example, the style information of one embodiment has the following:

"Segmentation parameters". A number of these affect the way in which the input video or input soundtrack will be segmented. Many techniques for segmentation of video are well known in the art, such as segmentation into shots using color histogram techniques, segmentation based upon the sonic characteristics of the associated soundtrack, etc. The segmentation may be linear, specifying a set of segments of equal weight in a list from start to end of the input material, or it may be hierarchical, in which the input material is divided into segments which contain other segments in a hierarchy of segment durations. Each style specifies which techniques to use, and specifies parameters controlling the segmentation including threshold values (such as degree of change of color histogram which is to be interpreted as a shot transition), minimum and maximum segment lengths, minimum number of segments to be specified, etc. In addition to these parameters controlling the segmentation of the input video or input soundtrack there is a parameter controlling the preferred segment duration—i.e. the preferred duration of the segments which are to comprise the output production. This controls the "cutting speed", an important characteristic of the output production.

"Selective inclusion parameters". These are a set of parameters which control the selection of elements of the input material (such as segments of video, music or soundtrack, selected images, or regions within images or video frames) to be used at different points in the output production. In particular, in this embodiment they are a set of target values for media descriptors including brightness (average luminosity of video or image) and preferred activity level (average total motion of video). In other embodiments, any of the kinds of descriptors mentioned above (under "Analysis and Description Components") can be used.

"Sequencing rules". Each style specifies the way in which sequencing is to be handled. For example, a parameter can specify whether the elements of the input material comprising the output production are to be chosen sequentially (in same order as they occur in the input material), non-sequentially (without regard to their sequence in the input material) or partly-sequentially (for example, within a certain distance of a time location which moves sequentially through the material, thus preserving the original sequence at a macroscopic scale but allowing non-sequential selection at smaller scales).

"Transformation parameters". These specify a set of transformations to be used in each style, and specify rules for which kinds of transformation are to be applied at different points in the output production. For example a set of parameters may specify a particular type of flash effect to be used in terms of its brightness, radius, duration, etc, and a set of rules may specify when this flash is to be applied, such as "in every fourth segment of the output production, but only if the time since the last flash effect exceeds 10 s and the brightness of the current segment is below a given value". Transformation parameters also specify the ways in which text and graphic elements are to be presented and animated, including static and dynamic values for position, size, shape, color, etc.

"Combination parameters". These specify the way in which elements of the input material (and material generated by the system) are to be combined: for example the types of transition (cut/dissolve/wipe) to use, how often and in what sequence to use each type, the duration of transitions, when and for how long to generate blank backgrounds, when to overlay text/graphics elements and what type of material they may be overlaid on top of (for example, to avoid overlaying white text on video material of brightness above a certain value), etc.

The precise choice of parameters and their values is both highly dependent on context and partially subjective. The range of possibilities is enormous and influenced by factors such as the type and range of input material which must be handled successfully, the demographics and preferences of target users of the system, and other such factors.

Generating Variety in Edit Decisions

In order to create an interesting production, it is usually necessary to introduce some variation in the edit decisions through the course of a production. For example, in most cases it is desirable to vary the preferred segment duration introduced above. A production consisting of segments of identical length would quickly become tedious, so the duration of segments must be varied to create a satisfying "edit rhythm".

In one embodiment, this need to introduce variety is addressed in several ways which may be used singly or in combination:

"Sections" and "sub-styles". The output production is structured as a series of sections, each of which is assigned a different sub-style. These sub-styles are used in a certain order, the sub-style sequence, in which sub-styles may optionally be repeated. Each sub-style contains values for some or all of the style parameters (and/or logic for generating style information). For example this scheme makes it possible to specify a style which defines three sections in the output production, in which the first section comprises long segments, of low brightness, with few special effects, concatenated with slow dissolve transitions, the second section comprises short segments, of high brightness, with many special effects, butt-edited together with sharp cuts, and the third section has the same characteristics as the first.

"Gradual evolution". It is also possible to specify gradual changes for some subset of the style parameters. For example, instead of the two contrasting sections of the previous example, there can be a slow evolution from the characteristics of the first sub-style to the second sub-style. In this example it is also possible to have two clearly-defined sections with most parameters changing abruptly at the sub-style transition, yet allow a small number of parameters to vary gradually during the course of the output production.

"Stochastic generation". Limited random variations are introduced at the level of each segment of the output video, providing the constructor with some variation in parameter values for each segment. For example a sub-style may specify that preferred segment duration is to be assigned a random value between 1 S and 2 S using a normal distribution with standard deviation of 0.25 S. In this case, each time the constructor requests a value from the sub-style, the supplied value will be different, but will always lie between the 1 S and 2 S limits.

"Value cycles". These also operate at the level of each segment of the output video. Each parameter is assigned a series of values and these values are used in a repeating sequence. For example in a particular sub-style, preferred segment duration might have a sequence of 3 values: 4, 2, 2 (seconds). Wherever this sub-style used, the durations of the segments in the output production will cycle 4, 2, 2, 4, 2, 2, 4, 2, 2, etc. Cycle lengths for different parameters may be the same or different. For example, in table 1 below, segment target brightness alternates between dark and bright (cycle length of 2), segment duration and transition type have a cycle length of 3, every 4th segment is transformed to monochrome and every 8th segment includes a flash effect. The overall pattern will only repeat every 24th segment. This creates variety, yet introduces a cyclic quality into the edit rhythm of the output production. Many viewers will not notice this explicitly—it may be subliminal—but it creates a different effect to stochastic variation and will be perceived as improving the quality of the production in some cases. This is particularly true when the output production is a music-based production as described below.

TABLE 1

|  | Cycle Length | 1 | 2 | 3 | 4 | 5 | 6 | 7 | 8 | 9 | 10 | 11 | 12 |
| --- | --- | --- | --- | --- | --- | --- | --- | --- | --- | --- | --- | --- | --- |
| Target Brightness | 2 | Dark | Bright | Dark | Bright | Dark | Bright | Dark | Bright | Dark | Bright | Dark | Bright |
| Duration (s) | 3 | 4 | 2 | 2 | 4 | 2 | 2 | 4 | 2 | 2 | 4 | 2 | 2 |
| Transition type | 3 | Cut | Cut | Diss. | Cut | Cut | Diss. | Cut | Cut | Diss. | Cut | Cut | Diss. |
| Color or Monochrome? | 4 | M | C | C | C | M | C | C | C | M | C | C | C |

TABLE 1-continued

| | Cycle Length | 1 | 2 | 3 | 4 | 5 | 6 | 7 | 8 | 9 | 10 | 11 | 12 |
|---|---|---|---|---|---|---|---|---|---|---|---|---|---|
| Flash effect? | 8 | No | No | No | No | No | No | No | Yes | No | No | No | No |
| Time | | → | | | → | | | → | | → | | | → |

Selection of Elements of the Input Material to Construct the Output Production

A central function of the constructor is to select and sequence the elements of the input material (such as segments of video, music or soundtrack, selected images, or regions within images or video frames) which will form the output production. This will now be described for cases where the input material is video and the elements of the input material in question are video segments. The process for other media such as a set of images is related and generally simpler.

As described above (see "sequencing rules"), styles specify whether the elements of the input material comprising the output production are to be chosen sequentially, non-sequentially or partly-sequentially from the input material. The process of selecting elements of the input material involves a number of complexities which will now be explained with reference to a sequential case and a non-sequential case. Variants of these cases, such as partly-sequential cases, can be achieved using a mix of the techniques described in the following.

Segment Selection: a Sequential Case

Figure 4:
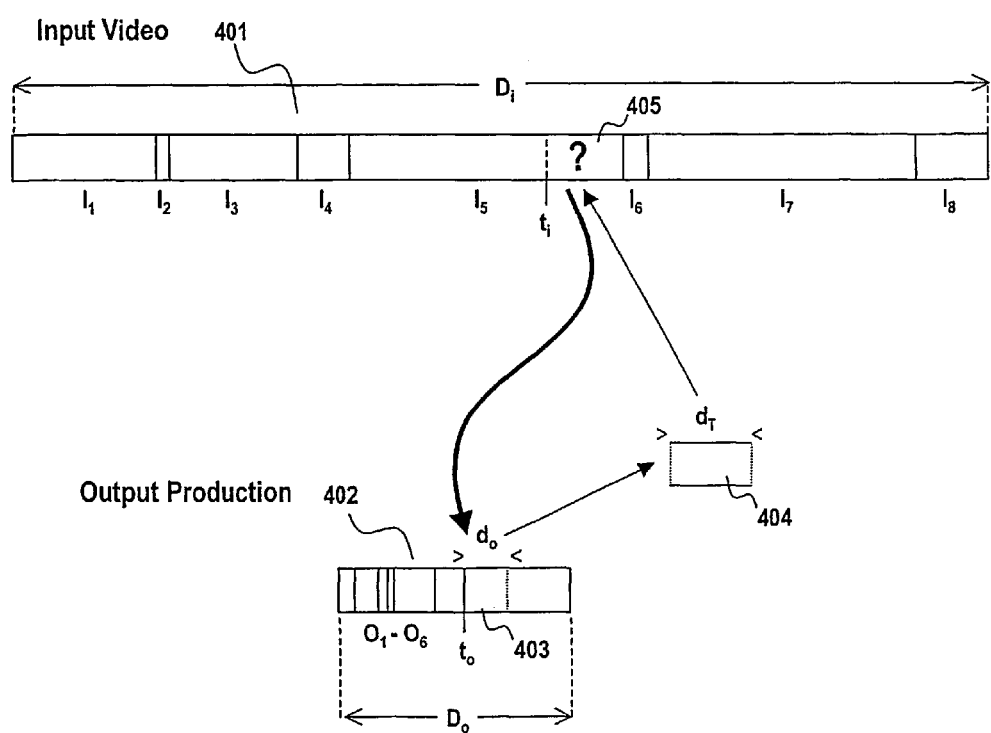
FIG. 4 shows the embodiment of FIG. 1 searching input video material to derive a suitable segment.
Figure 5:
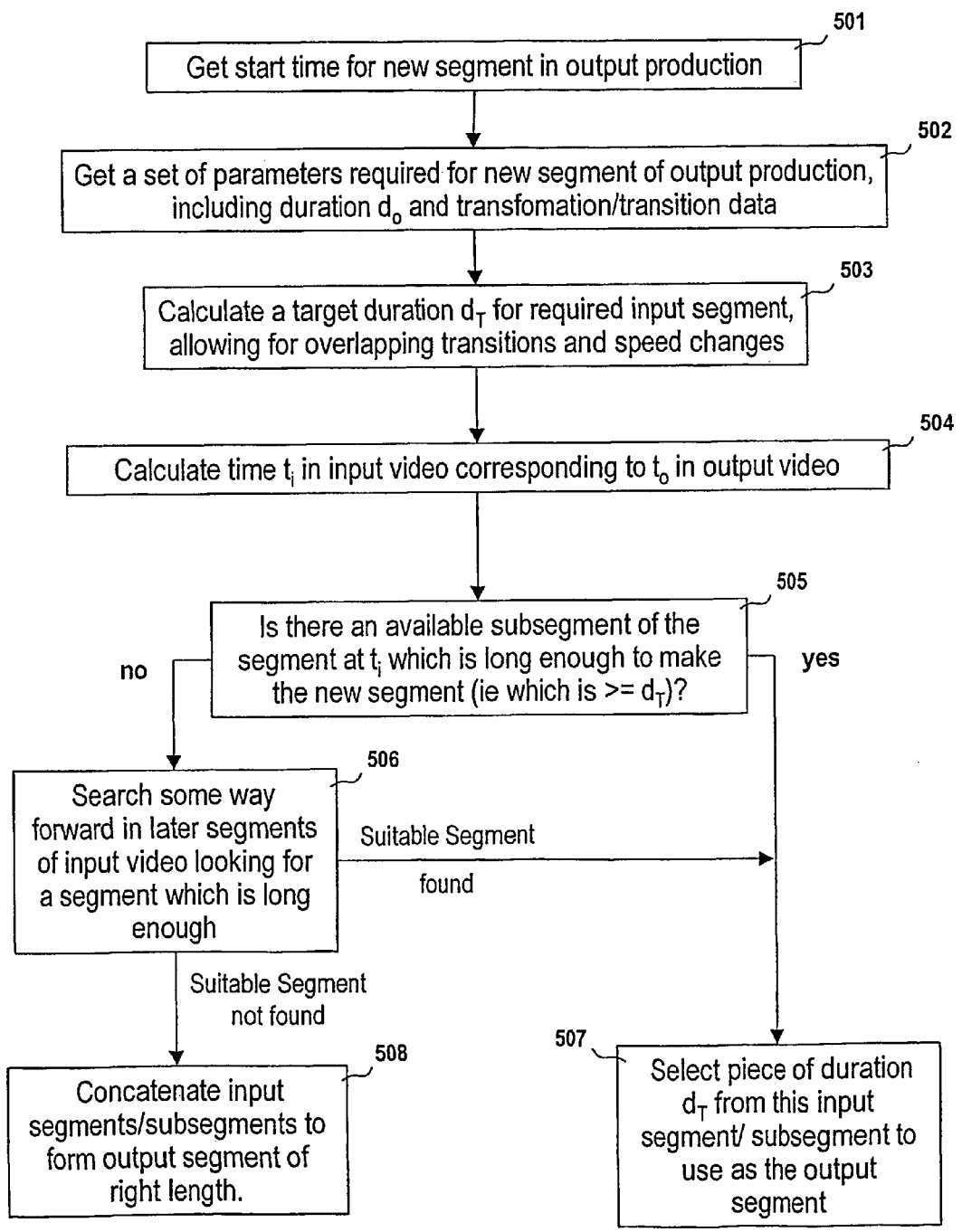
FIG. 5 is a flowchart illustrating logic for selecting a video segment in the example of FIG. 4, such that the output production preserves the order of segments found in the input material.

FIG. 4 shows a common sequential case in which there is a single contiguous piece of input video [401]. The input video has duration $D_i$, significantly longer than the output production [402], which is of duration $D_o$. The ratio of input to output durations is $R_{io}=D_i/D_o$. The input video has been divided into segments such as shots, labeled $I_1$–$I_8$ in this figure.

The constructor builds the output production segment by segment. In this example, it has already built 6 segments, $O_1$ to $O_6$ and is about to build the next segment. To select a new segment the constructor follows the flowchart in FIG. 5. The process will now be described with reference to both FIGS. 4 and 5.

The constructor first gets the start time in the output production [501] for the new segment [403], labeled $t_o$ in FIG. 4. It then gets a set of parameters required for the new segment, for example from the style information, including the required segment duration $d_o$ and data about effects and transitions [502]. The duration then has to be adjusted [503] to produce a target segment duration $d_T$ [404] for the segment which is to be taken from the input video, allowing for two things:

If there are overlapping transitions such as dissolves before and/or after the segment, the duration of these must be included in the target segment duration $d_T$.

If the effects to be applied involve any speed change, the duration has to be scaled. For example, if the output segment is to be played at double speed, the target segment duration $d_T$ has to be twice the duration of the output segment $d_o$.

The constructor then calculates a time $t_i$ in the input video at which it will start looking for a suitable segment [504]. In sequential cases it is generally desirable that the ouput production be approximately linear with respect to the input video, and to achieve this the input video segment should ideally be taken from a time location calculated as follows:

$$t_i = R_{io} * t_o$$

In other words the relative position in the input and output videos should be the same.

The constructor checks whether there is a subsegment of the segment at $t_i$ which is long enough to form the new segment—i.e. which is at least $d_T$ in duration [505]. In addition to having duration $>=d_T$, the choice of subsegment is subject to two constraints:

It should not cross a segment boundary in the input video. For example, if the input video has been segmented into shots, it is undesirable to cross a segment boundary because doing so will introduce an unintended cut into the output production. Also shot boundaries in raw video material are often not clean cuts; for example there may be a few bad frames as a camcorder re-synchronizes after being re-started, making it undesirable to use material that crosses a shot boundary. Referring to FIG. 4, the question is whether the subsegment of video between $t_i$ and the end of input segment $I_5$ [405] is at least $d_T$ in duration.

Since this is a strictly sequential case, output material is always presented in the same time order as it appears in the input video and may not repeat. Thus in order for a subsegment to be selected it must start from a location in the input video which is later than previously-selected material. The search logic may optionally search backwards from $t_i$ but it must only go back as far as the end of the previously-used material. (This is not shown explicitly in FIG. 5.)

If such a piece cannot be found within the input segment at $t_i$, the constructor searches forward [506] into later segments looking for a segment which is long enough (duration $>=d_T$). However there is no point searching too far forward: selecting a segment far ahead of the current location in the input video would not allow later segments to be sequential. A suitable location in the input video at which to stop searching is given by the formula $t_{i\text{-}stop}=R_{io}*(t_o+d_o)$.

If the constructor finds a segment or subsegment from the above, it then chooses a piece of duration $d_T$ from within it [507] to use as the output segment. The choice of this piece can be simple: it may, for example, simply choose the first part of the subsegment. Or it be sophisticated, attempting to find a piece of length $d_T$ which meets other criteria, for example by matching descriptor target values (using similar principles to those described below for a non-sequential case) or by selecting pieces which are estimated to be more interesting or superior in quality to the surrounding material (also see below); this is most useful when the segments of input video are significantly longer than the segments of the output video, a common situation.

If the constructor is unable to find a suitable segment from either of the above approaches, it relaxes the constraint that an output segment should not contain a segment boundary in the input video and builds an output segment of duration $d_T$ from two or more segments/subsegments of the input video [508].

Segment Selection: a Non-Sequential Case

In this non-sequential case (FIG. 6) some of the steps are the same as in the sequential case just described.

As in the above, the Constructor first gets the start time in the output production for the new segment [601] and then gets a set of parameters required for the new segment, for example from the Style Information, including the required segment duration $d_o$ and data about effects and transitions [602]. In this non-sequential case, it also gets a set of target descriptor values from the style information [603]; it will select segments which match this set of values.

The duration then has to be adjusted to produce a target segment duration $d_T$ for the segment which is to be taken from the input video [604], allowing for transitions and speed changes in the same way as described above for a sequential case.

The next step [605] is to find a set of candidate segments or subsegments of the input video. These are segments which are at least $d_T$ in duration. They may also have to satisfy other criteria. For example, although some re-use of material may be permitted in certain non-sequential cases (unlike a strictly sequential case) it is generally desirable to limit the number of times the same material appears in the output production. This can be achieved by keeping a count of how often each part of the input video has been used, in which case a candidate (sub)segment is any contiguous part of a single segment of the input material that has been used less than the maximum permitted number of times and is at least $d_T$ in duration.

If no such (sub)segment can be found, the constructor relaxes a constraint—for example, as in the sequential case above, it may build an output segment of duration $d_T$ from two or more segments/subsegments of the input video. (Not shown in figure.)

The Constructor then gets descriptor values from the media description for these "candidate" (sub)segments [606] and evaluates a distance in descriptor space between each of these candidate points and the target descriptor values [607]. (This process is further described below, and shown in expanded form in FIG. 7). Finally the constructor selects the candidate segment corresponding to the candidate point that has the smallest distance from the target point [608] and uses it in the output production [609].

Selecting Segments by Proximity in Descriptor Space

As mentioned above, there is a need to select a best-match (sub)segment from a set of candidate (sub)segments. The best match is the (sub)segment which lies closest to the set of target values in the "descriptor space" (an n-dimensional space in which each of n descriptors is represented)—i.e. for which a distance measure between the given point (coordinates defined by the target values from the style information) and the candidate point (coordinates defined by the set of values in the media description) is smallest.

Although simple in principle, there are several issues to consider in this matching process. They will be described with reference to FIG. 7. This description concerns cases where the input material is video, but the principles apply to other media.

1. To ensure that the distance calculation gives results which correspond well to human expectations, it is important that all descriptors use a perceptual scale [701]. This is a scale in which a given difference in the descriptor value according to the scale is experienced by a user as a given difference in the perceived value, regardless of the position within the overall descriptor range. In most cases this can be approximated by the logarithm of some physical property.
2. In general, descriptors may be in different units with very different ranges. For example segment duration may be in seconds ranging from 0 to 30 while another descriptor uses a scale from 1 to 1000. To prevent this from affecting the distance calculation, we must normalize the units to a common scale such as 0 to 1. Such "unit normalization" [702] can be done using a straightforward linear transformation such as:

$$x' = (x - xmin)/(xmax - xmin)$$

where:
x is a value in native (not unit-normalized) units,
xmin is the minimum value in native units
xmax is the maximum value in native units
x' is the value in unit-normalized units 3. It is desirable that the system should produce satisfactory output for any kind of input video material provided by a user, without any constraints. Thus the system has no control over the spread of the descriptor values in the video description. For example, consider a case in which a set of descriptors extracted by analysis have similar values for all but one of the segments of the input video material. In other words, all but one of the points representing the segments are clustered together in a small part of the descriptor space, and the remaining point is far away. In this case it is possible that the single isolated point is the closest point to all the target values provided by the style information. If a simple distance measure were used, it would lead to this segment being chosen every time, potentially resulting in an output production which consists of the same segment repeated a great many times—clearly not an acceptable result.

One approach to solving this problem is to exploit variation in the extracted descriptors in order to create variety in the output video, even when the variation is small. This can be achieved by "distribution normalization" [703]: i.e. linearly scaling and shifting the values of the descriptors for each point so that such clustering is eliminated or reduced. To normalize the distribution, we apply a formula such as the following to each descriptor in turn:

$$x' = ((x-m)*s'/s) + m'$$

where:
x is a value before distribution normalization
m is the mean of the input values
s is the deviation* of the input values
m' is the mean of the desired (output) distribution
s' is the deviation* of the desired (output) distribution
x' is the value in distribution-normalized units

*For example this can be the standard deviation or the average deviation (in their usual statistical definitions). The standard deviation is generally considered to be more accurate in most cases, while the average deviation can be calculated more quickly.

Distribution normalization can be applied in either of two ways:

a) Normalize both the set of descriptor values from the video description and the set of target values from the style information so that they conform to a common, standardized distribution—i.e. fixed values for m' and s'. (Another way to do this, identical in end-result, is to adjust one set of values so that it has the same distribution as the other.)

b) Normalize just one set of values—for example just the values from the video description—to a common, standardized distribution. In this case the distribution of each set will not necessarily be the same.

These two approaches may be used in different cases. Each has advantages and disadvantages and may be supported in different styles. The advantage of a) is that it tends to give unique matches because the distributions "lie on top of each other". Its disadvantage is that it discards any deliberate global bias of the mean of the values in a style; in fact it becomes impossible to bias the mean of a style towards either extreme. For example, if we create a style in which all target values of brightness are high, then option a) will discard that preference for bright segments, giving the same bright/dark mix as a non-biased set of values. Conversely the advantage of b) is that it can preserve such biases, and its disadvantage is that it may not give unique matches so successfully since the two distributions may not "lie on top of each other". (On the other hand, since the distribution of values from the Style Information is under control of the system designer, they can probably be made similar manually. But this may not be easy in all cases.)

4. After applying distribution normalization, outliers in the data may fall outside a given range. To facilitate the distance calculation it is usually necessary to discard such outliers or to bring them back within given limits [704].

5. Some descriptors may be more significant than others in determining perceived similarity. It is desirable to weight descriptors accordingly.

It is also desirable to allow certain descriptors to be ignored in some, but not all cases. For example a particular sub-style may specify target brightness and segment duration, but ignore another descriptor such as activity level. This sub-style may have to be used alongside other sub-styles which do specify activity level, and the distance values produced in each case must be comparable with each other. This can be achieved in the distance calculation by adding distance only for descriptors which are "significant", i.e. which are not to be ignored. This is equivalent to saying that, for a descriptor which is not significant, any value is a perfect match to the target value of that descriptor.

A distance calculation which takes into account weighting and allows descriptors to be ignored is as follows [705]:

$$D = SQRT(SUM_D((|v_{gd}-v_{cd}|^2)*w_d))$$

where:
D is the distance for a pair of points (one given, one candidate)
SQRT is a square root operation
$SUM_D$ is the sum over the set of significant descriptors (i.e. excluding the ones to be ignored)
$v_{gd}$ is the value of the d'th descriptor for a given point
$v_{cd}$ is the value of the d'th descriptor for a candidate point
^2 is a squaring operation
$w_d$ is the weight for descriptor d 6. The candidate segments, or a subset consisting of the those which lie closest to the target point, are listed in the order of their proximity to the target point [706]. Note that in the example described above with reference to FIG. 6 it is only necessary to supply the single closest match. However, to support manual touch-up as described elsewhere in this document, it is desirable to have a list of alternative candidate segments ordered by proximity.

The above describes direct matching of descriptors in which the types of descriptor in the Style Information are identical to the types of descriptor in the media description: for example a brightness descriptor in the Style Information is matched to a brightness descriptor in the media description. It is also possible to use indirect matching, in which the set of descriptors used in the Style Information are mapped to a different set of descriptors in the media description via a mathematical or algorithmic relationship. For example the style information might have a "PeopleEnergy" descriptor defined as:

$$PeopleEnergy=0.6*Log(Activity)+0.4*PersonProbability$$

where "Activity" is a measure of the total average movement in a video segment and "PersonProbability" is a measure of the likelihood that the segment contains images of at least one person (for example using a skin-color detection algorithm well-known in the art). Such descriptors, defined by a mathematical or algorithmic manipulation applied to one or more other descriptors, may be termed "derived descriptors".

It is sometimes effective to define target values in the style information in terms of such derived descriptors, because this allows the use of "higher-level" descriptors which are closer to the kind of semantically-meaningful descriptors understood easily by human beings. In the above example, the style information would contain target values for PeopleEnergy while "Activity" and "PersonProbability" would be extracted by signal analysis of the input video.

If derived descriptors are used, the constructor logic can calculate values for the derived descriptors by applying mathematical or algorithmic manipulation to the lower level descriptors of the media description and then perform descriptor matching on the values of the derived descriptors.

Optimizing the Selection of Material

As mentioned above, the amount of input material is often much greater than the length of the output production and it is therefore desirable in some cases to select parts of the input material which are estimated to be more interesting or superior in quality to the rest of the material This is related to segment selection as described above, and it may use some of the same techniques, but its purpose is somewhat different: segment selection as described above is primarily concerned with where parts of the input material should be placed in the output production, whereas optimizing the selection of material is primarily concerned with which parts of the input material should be used in the output production.

Present technology does not provide techniques to determine the semantic content of video or images reliably across all kinds of material using signal analysis techniques. It is therefore impossible for an automatic system to select material exactly as a human video editor would do it. Furthermore, this is a highly subjective subject: different human editors would select different material. Nevertheless it is possible to bias the selection of material in such a way that the majority of users will judge it to be more interesting or superior in quality to the average of the input material. To put it another way, the goal is automatically to select material which is generally "better", at least within certain types of material, than an unbiased set of samples taken from the input material.

Here are two examples of how this may be achieved:

1. Across many kinds of content, material containing images of people will generally be considered more interesting than material not containing images of people. Image processing techniques for detecting the presence of human beings are well known in the art—for example using skin color, face shape, or body shape. Using such techniques, it is possible to calculate a descriptor which represents the probability that an image or a segment of video contains one or more human beings. Material with a high value of this descriptor can then be selected in preference to material with a low value of the descriptor.

2. In "handheld" video footage (i.e. video recorded by a camera held in the hands rather than attached to a fixed mount such as a tripod) there is tendency for users, especially non-professional users, to move the camera around until they see something of special interest in the viewfinder. In other words, for handheld material, segments of the resulting video with low camera movement tend to be more interesting than segments with high camera movement. Techniques for estimating camera movement are well known in the art—for example techniques based upon extracting motion vectors. Thus it is possible first to identify that input video material is handheld (this can be determined by analyzing the pattern of movement in time, or it can simply be information provided by the user in response to a prompt) and then, if it is handheld material, to select portions with low camera movement.

These techniques may be provided as options which a user of the system can invoke when desired. Alternatively they may be invoked when the user selects certain styles and not invoked for other styles: for example the low-motion handheld techniques just described may be desirable in a style intended to produce output productions which are soothing or "laid back", but not suitable in a style intended to create high-energy, fast-paced productions.

The Media Scene Graph (MSG)

As explained above, the MSG is a data structure produced by the constructor which completely represents the form of the output production. In this sense it is related to the concept of an edit decision list (EDL) well known in the prior art. However the MSG is also the primary underlying data structure which the user interacts with during touch-up, while a typical EDL is a linear structure which does not lend itself well to this kind of manipulation. An MSG structure which is better-suited to this kind of manipulation will now be described with reference to FIG. 8.

The structure is essentially a tree in which the output production is the root [801]. Some of the branches of the tree are concerned with definitions; these specify the properties of certain entities which are used in the output production. They include a definition for every kind of transformation [802] used in the Output Production (e.g. specifying that a certain flash effect has a certain brightness, color, radius, duration, etc). They also include definitions for transitions [803] such as dissolves, definitions for text [804] including animated text, definitions for graphic elements [805] including animated graphics, definitions for blank backgrounds [806], etc.

Figure 8:
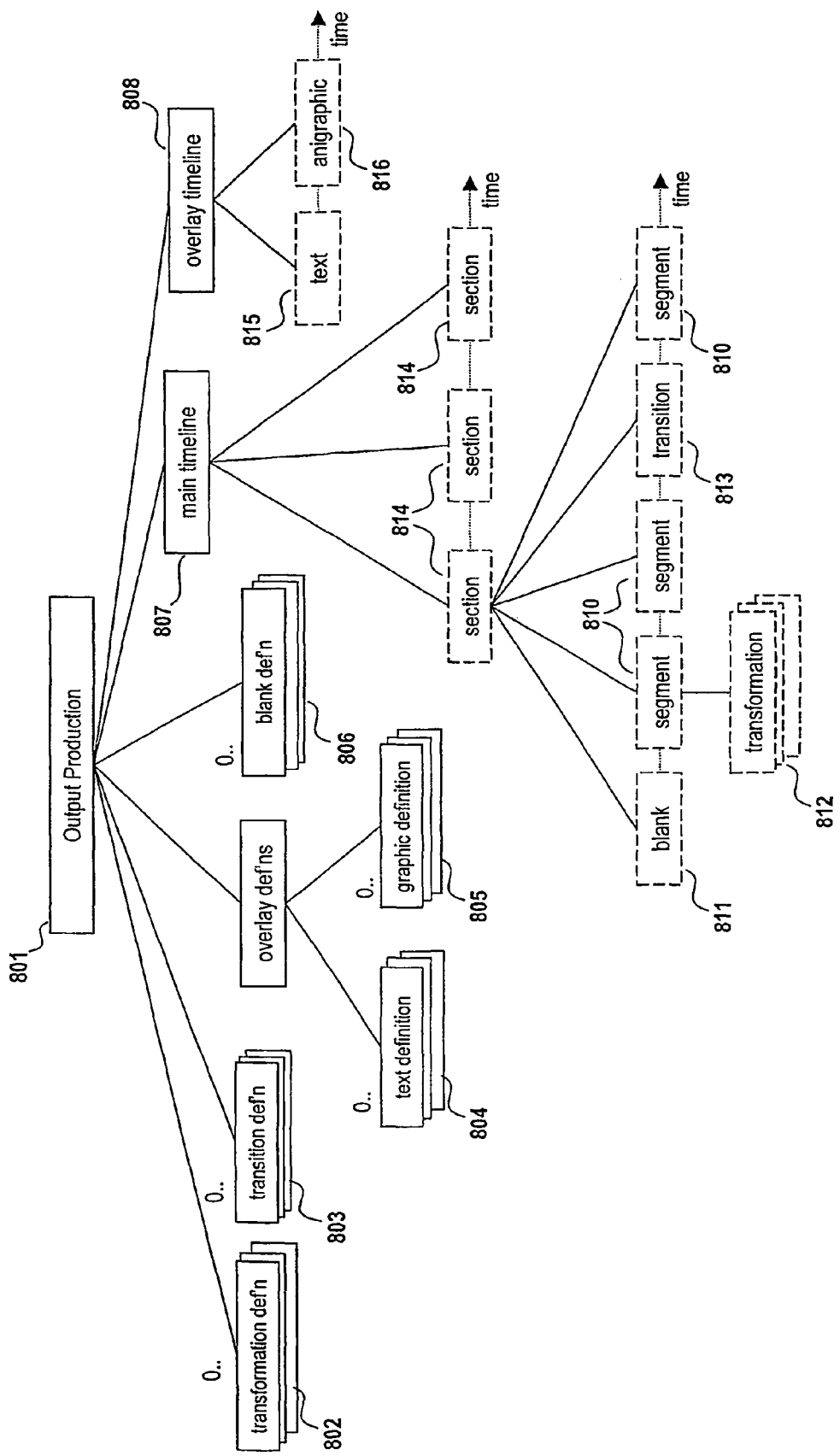
FIG. 8 illustrates the structure of a media scene graph which is generated in the embodiment of FIG. 1 and which is a complete representation of the form of the output production or a complete set of instructions for making the output production.

The MSG also has one or more branches for timelines. FIG. 8 shows one main timeline [807] and one overlay timeline [808] with purposes similar to the two timelines of FIG. 2. The main timeline contains an entry for each of the segments forming the output production including segments derived from elements of the input material [810] and blanks constructed by the system [811]. Transformations [812] of those segments and the transitions [813] between them are also specified; these are in the form of references to the transformation and transition definitions mentioned above. The main timeline may also support an additional level of structure in the form of sections [814], each corresponding to the use of a single sub-style (see "Creating Variety in Edit Parameters" above); this facilitates user-selected touch-up operations which are to be applied to entire sections of the output production. Finally, the overlay timeline [808] specifies a sequence of overlays by referencing the textual [815] and graphical [816] definitions, optionally including animation information.

The entries for segments, overlays, etc which comprise the timelines contain time data relating both to the output production, and in some cases to the input material. For example, for video segments it is necessary to specify a location (such as a start-time) and a duration in the output production; it is also necessary to specify the source such as a start-time and duration in the input material.

Graphical User Interface (GUI)

Due to the high degree of automation in the production process, the invention can in some cases produce an output production of acceptable quality without human intervention. Thus, in certain embodiments of the invention, the GUI can be very simple, or indeed non-existent.

Figure 9:
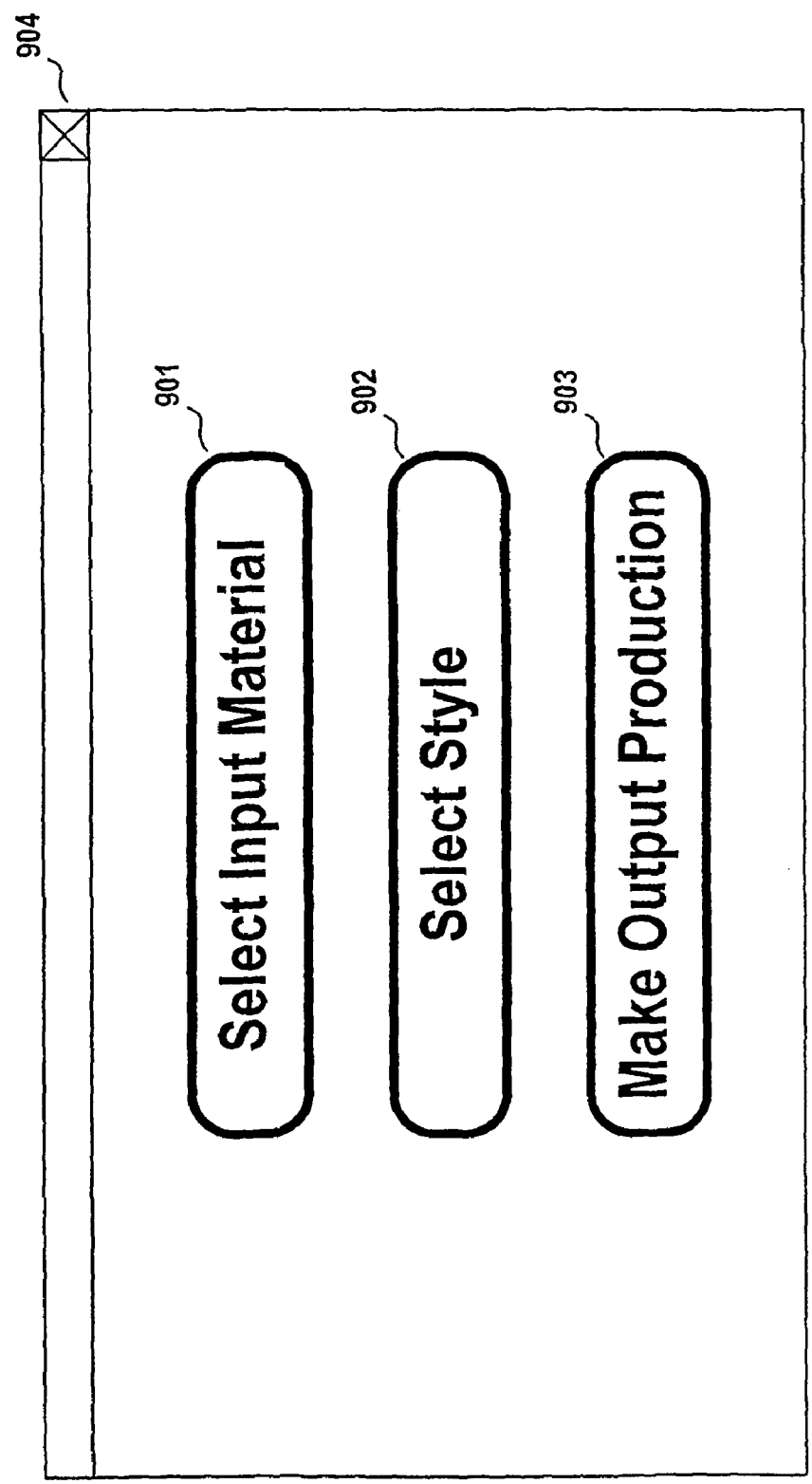
FIG. 9 illustrates a first, simple GUI suitable for use in the embodiment of FIG. 1 with three main user controls.

An example of a very simple, yet viable GUI is shown in FIG. 9. There are three main user controls, such as buttons, for performing the following functions:

1. A control allowing the user to select the input material [901]. For example, this can prompt the user to give the name of one or more video or image files containing the input material
2. A control allowing the user to select a style [902]. For example, when this is invoked, the user can be shown a list of available styles and prompted to select one.
3. A control which causes the output production to be created [903]. For example, this can prompt the user to give the name of a file which will store the output production. Once the user supplies this filename, the main processing modules of the system—the media analyzers, the constructor and the renderer—are invoked in order to create the output production.

There is also a standard control for closing the program [904].

Figure 10:
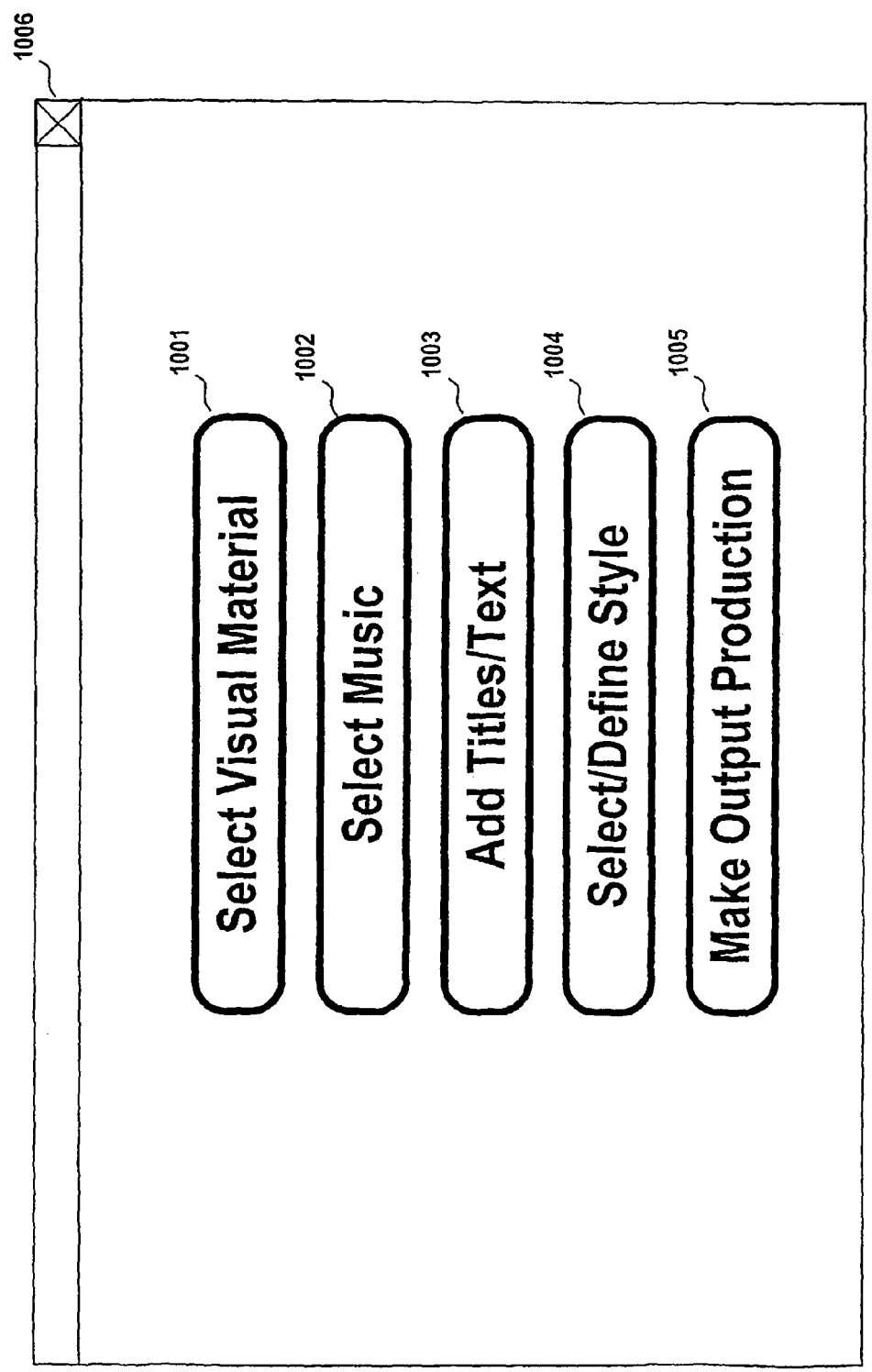
FIG. 10 illustrates a first, simple GUI suitable for use in the embodiment of FIG. 1 with five main user controls.

A variant of this is shown in FIG. 10. This has five main user controls, such as buttons, for performing the following functions:

1. A control allowing the user to select the input visual material [1001]. For example, this can prompt the user to give the name of one or more video or image files containing the input material. It can also prompt for the names of one or more files containing graphical overlays such as logos.
2. A control allowing the user to select input music [1002]. For example, this can prompt the user to give the name of one or more sound files containing recorded music.
3. A control allowing the user to add text [1003]. For example, this can prompt the user to enter textual information into a form. The text will be overlaid on the output production. Uses of overlaid text include titles, credits (for people and organizations involved in the production), subtitles, messages such as explanatory or advertising messages, etc.
4. A control allowing the user to select or define a style [1004]. To select a style the user can be shown a list of available styles and prompted to select one as described in the previous example. To define a style, the user can for example be shown a form containing the values of all the parameters of the style Information and prompted to enter or alter the values.
5. A control which causes the output production to be created [1005]. This can prompt the user to give the name of a file which will store the output production as described in the previous example. Once the user supplies this filename, the main processing modules of the system—the media analyzers, the constructor and the renderer—are invoked. In this example, the visual material is edited to music to in order to create a music-based production as described below, and the music replaces or is mixed with the input soundtrack. The text and graphical elements are then overlaid to produce the output production. The text and graphics may be animated to the music as described below.

There is also a standard control for closing the program [1006].

In either of the above examples the output production can be viewed from an external program such a media player. Alternatively, the GUI elements described above can be supplemented with a viewing window and "transport controls" well-known in the art, so that the user can view the output production from within the system.

In other embodiments, the GUI may include additional features for manual interaction. The motivation for these is that, although the primary purpose of the invention is to automate the editing process, it cannot always do this completely in every case. Depending on the nature of the input material and the application in question, an output production created fully automatically may not match the user's preferences in every detail. Thus it may be desirable to support features for manual interaction such as:

Pre-selection of content. This provides an option for the user to select or deselect elements of the input material (such as segments of video, music or soundtrack, selected images, or regions within images or video frames) prior to automatic construction. The user identifies elements of the input material and specifies whether, where, or in what sequence they are to be used during the construction process. For example, the user may specify that a particular segment A must be included in the output production and must be the final shot, that another segment B is optional with a certain probability of inclusion depending on other factors that arise during construction, that a third segment C should be included only if B is included and must occur later than B in the output production, and that a fourth segment D must not be included. This process of pre-selection may be assisted by the media descriptions: for example, segmentation information in a video description can be used to present input video to the user as a series of shots; this is generally more convenient for the user than a single contiguous piece of video. Information from the media descriptions can also be used to categorize or cluster input material in ways which help the user: for example a set of input images or input video segments can be presented to the user in a set of "bins" each containing a set of images which are similar in some respect. The user can, if required, refine this categorization manually by adding or removing items from the bins; she/he can then apply instructions such as those above ("include", "do not include", etc) to entire bins of images.

Pre-selection of treatment. This provides an option for the user to select or specify, prior to automatic construction, aspects of the processing which will be applied to elements of the input material. For example the user might specify that all transition effects of the output production taking place during a certain section of the input music must be of a certain type, such as dissolves. Or she/he may manually select a subset of the input images and specify that those images are to be rendered in monochrome in the output production. Once again, automatic processes such as segmentation and clustering based upon information from the media descriptions can be used to assist the user. For example the system can categorize segments of the input video input by brightness, present the user with the set of segments which fall below a certain brightness threshold, allow the user to add/remove segments from this set, and then let the user specify that the brightness of these segments is to be increased by a certain percentage in order to enhance their visual quality.

Touch-up of the output production. This allows the user to edit the output production after automatic construction, for example by replacing video segments of the output production with alternative segments from the input material while preserving the duration and effects applied to the segment, or by changing some of the transition effects, by adding or removing special effects, by overlaying additional text or graphics, etc. Yet again, information from the media descriptions can be used to assist the user in these operations. For example, when the user wishes to replace a segment of video in the output production, the system can present her/him with a representation of a set of alternative segments from which to choose. These segments can be listed in order of their similarity with the original segment according to a similarity measure derived from the video description. In a variant of this example, the user can be presented with two options such as "Replace with Similar Segment"/"Replace with Contrasting Segment"; once the user has selected one of these options, the system will supply a suitable alternative segment.

A quite different example of how information in a media description can be used to assist the manual touch-up process concerns the case where the output production is a music-based production. When video is "edited to music" by experienced video editors, the usual practice is to match certain visual elements to certain timing characteristics of music such as beats. In this case, timing information derived from the music description can be used to influence touch-up operations which the user is performing manually on the visual material of the output production so that time-critical visual events such as cuts and flashes are automatically aligned with beats, sub-beats and other significant times in the music. For example, as the user alters a cut point between two segments of the output production using a standard GUI operation such as dragging, information from the music description can be used to cause the cut point to jump between times in the music at which the amplitude of the music signal is high or there is other indication that a strong beat is present. A related option is to use quantization, a technique well-known in the field of music sequencers, in which event boundaries are aligned to a timing grid which is itself aligned to the beat of the music.

The GUI for supporting these manual operations can be constructed using standard elements including lists, hierarchical representations (such as those used in file managers), visual thumbnails, audio waveform displays, timelines, clip windows with transport controls, etc. These elements are well known in the art, being common in tools such as Non-Linear Video Editors (NLE's), image editors, audio editors and other media-processing software.

Figure 11:
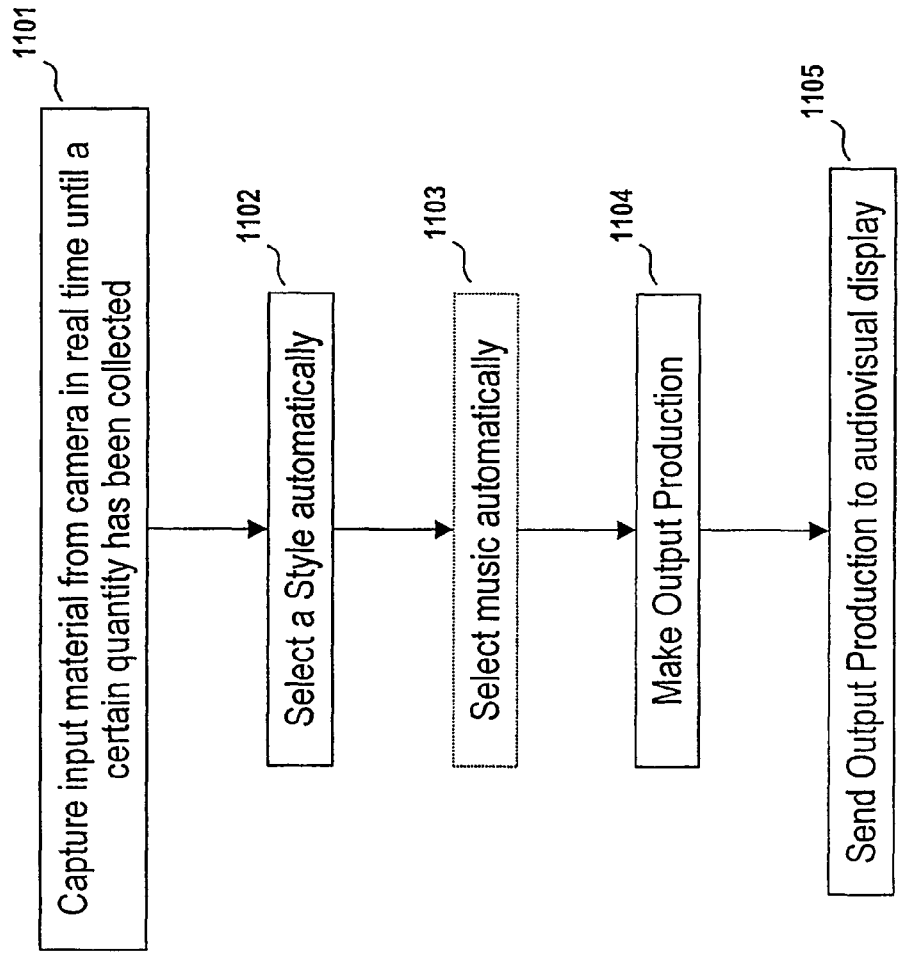
FIG. 11 illustrates an embodiment of the invention which does not require user interaction in normal use.

The invention can also be embodied in a non-interactive system which simply presents output productions and does not include any GUI elements for normal use (although such a system does require a GUI for configuring and managing it). Logic for an example of such an embodiment is illustrated in FIG. 11. This is suited to creating output productions from input material which is arriving continuously, for example video or images from a "web cam" (a camera connected to the Internet). Material is captured from the camera until a certain quantity or duration has been collected [1101]. At this point, a style, and optionally a piece of input music, are selected automatically [1102, 1103]. These can simply be random selections from a number of options, or the style and music can be matched to characteristics of the video description/images description by a process of descriptor matching as described elsewhere in this document. The system now has the information it needs to make an output production and it does so [1104]. Finally it sends the output production to an audiovisual display device such as a multimedia computer or a television set [1105]. During the creation and delivery of this output production, this system can continue capturing material ready for another production. One use for this embodiment of the invention would be to provide automatically-constructed audiovisual productions at regular intervals to people in a public space, where the input material is being captured from a live camera.

Music-Based Productions

The embodiment is particularly suited to creating output productions in which the processing and timing of visual elements is governed by the characteristics and timing of an underlying music track. This is sometimes called "cutting to music" and is common in music videos, animated productions, promotion and marketing videos, television commercials and many other forms. Such productions are referred to as "music-based productions" in this document.

The general principle of music-based productions is that the music acts as the time reference. The visual elements are manipulated to conform to the music, but the music itself is not altered. Visual elements to which this may apply include motion video, images, animation, graphics and text. In addition, some non-musical audio elements such as speech and sound effects may be manipulated or positioned in time in ways which are influenced by the music. In general terms, the music is "master" and the other elements are "slaved" to it.

Music-based productions are constructed using a number of techniques. These techniques, today achieved through the skill of professional editors, include the following:

- The editing "pace" of the visual material is usually governed or influenced by some general characteristics of the music such as its tempo (i.e. beat speed), loudness, and overall level of perceived "energy". For example, when the music is faster or louder, the output production will be constructed from shots of shorter average duration and the transitions between shots will be faster, using more abrupt cuts and fewer slow dissolves. The musical characteristics controlling this not only vary from one piece of music to another but also from section to section within a single piece of music: for example the "energy" level in many pop songs is higher in the choruses than in the verses. A professional video editor will sense this and use a faster editing pace in the choruses than in the verses.
- The selection of visual material may also be influenced by the general characteristics of the music. For example, video with brighter colors or faster motion may be selected to accompany music with greater energy, and darker or more static visual material selected to accompany music which is slower or quieter.
- The timing of cuts and other transitions in the video will generally be synchronized with the beat of the music or with the timing of significant features of the music. This is sometimes known as "cutting to the beat" and is used extensively when video material is edited over a musical foundation.
- To varying degrees, the timing of events within shots of motion video may also be synchronized with the beat of the music or with the timing of significant features of the music. This is particularly true of motion events involving an abrupt deceleration, such as collisions between objects. For example, if a professional editor is incorporating a shot in which a falling object hits a floor, she/he is likely to align this moment with a strong beat or other prominent event in the music.
- Furthermore, the selection and timing of special effects applied to the video is often influenced by characteristics of the music. For example, flashes may be included in time with strong beats or other prominent musical events, or a brief freeze-frame effect may be applied at a static moment in the music. At a larger time-scale, some visual effects may be applied to entire sections of the music: for example in a music video accompanying a pop song, the visual material of the verses may be presented in monochrome, while the visual material of the choruses is presented in full color.
- Overlays such as text and graphics may be influenced by characteristics of the music. For example, the times at which these elements appear or disappear may be linked to strong beats or other prominent musical events. They may even be animated to the music so that their appearance and motion is dependent on the music: for example they may be animated to jump between different locations on each musical beat, or change size or color at certain times related to the musical structure.

In summary, when visual material is to be edited to match music, the professional editor has available a repertoire of techniques across a range of timescales, from the "microstructure" of musical beats or even subdivisions of beats, all the way up to the "macrostructure" of the main sections comprising the piece of music. When this is done successfully, the effect on the viewer/listener is enhanced: music and video are more likely to be perceived as a unified production and the emotional or dramatic impact is enhanced.

The embodiment automates the creation of music-based productions in several ways which will now be described.

Automation for Music-Based Productions

The nature of the music analyzer [116] and music description [117] have been presented above and we have already introduced several ways in which the creation of music-based productions can be automated or facilitated. This aspect of the invention will now be further described.

One simple way to match editing style to music structure is to control the editing parameters defining the visual character of the output production directly from parameters of the music description. For example, the tempo of the music can be used to control the cutting speed (the inverse of the average segment duration), beat-strength used to control the ratio of cuts to dissolves, and loudness used to control the brightness of segments selected from the input video. In a straightforward mapping of this kind, a fast-cut output production will result if the user selects a piece of music with a fast tempo. Or, to take another example, if the user selects a piece of music with contrasting loud and quiet sections, the output production may have corresponding bright and dark sections.

This approach is effective in some cases, and the invention allows for it to be supported: for example, it can be implemented in certain styles, so that the user can select this mode of operation by selecting those styles. However, this approach has limitations because it relinquishes nearly all control to the music. For example, if the music is very uniform, the output production may be monotonous, because the mechanisms described above for introducing variety are not active. Conversely, if the music has many rapid contrasts, the output production may lack coherency. So this approach tends to lack robustness to different pieces of music: it may produce acceptable output productions for some pieces of music, but is not guaranteed to work for a wide range of musical pieces.

A more sophisticated alternative is to select styles and/or sub-styles according to the characteristics of the music, but then to allow the style information to control or influence the individual edit decisions. This produces results which are more predictable and coherent for any input music, because all edit decisions may be placed within bounds allowed by the style information. It also allows the style information to create variety even when the music is very uniform, for example using the techniques of stochastic generation and value cycling described above.

Figure 12:
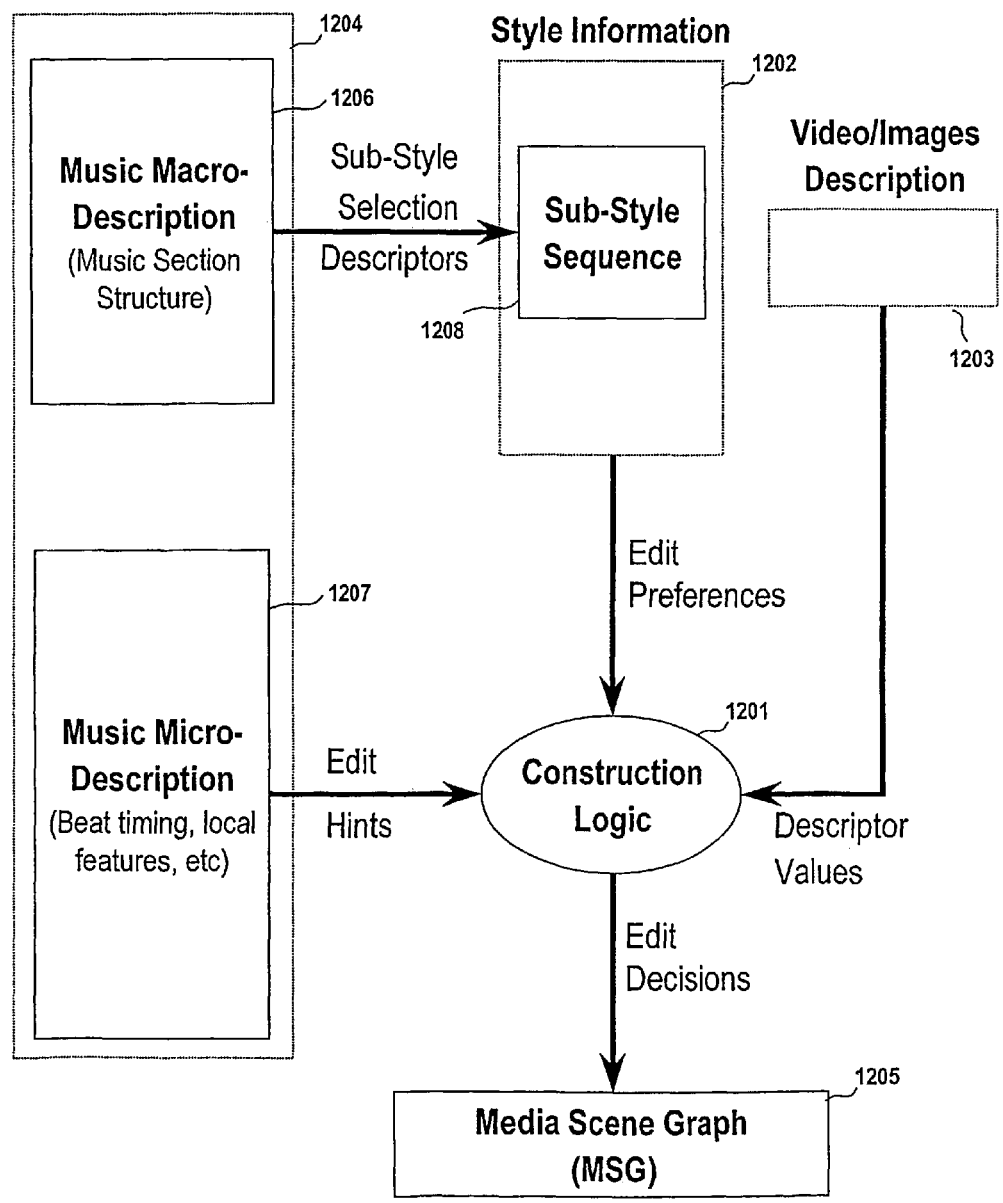
FIG. 12 illustrates an elaboration of the principle illustrated in FIG. 3, specific to the creation of music-based productions.

This approach conforms more closely to the central construction principle of the invention described above with reference to FIG. 3. It will now be elaborated for the case of music-based productions, with reference to FIG. 12.

As in the previous case discussed with reference to FIG. 3, the construction logic [1201] receives information from the style information [1202], the video/images description [1203], and the music description [1204]. In response to these inputs it generates edit decisions which are stored in the media scene graph [1205]. This diagram shows how the music description may be composed of two parts, a macro-description [1206] and a micro-description [1207], each performing substantially different functions.

The music macro-description [1206] contains a description of the input music at the timescale of major sections of the music, such as introduction, verse, chorus, etc. The characteristics of these sections are represented by a set of music section descriptors which are used to produce a sub-style sequence [1208]. As mentioned above, the sub-style sequence defines the order in which the sub-styles are to be used to generate the output production. Once the sub-style sequence has been established, there exists, for any time in the output production, a corresponding sub-style. Thus, when edit information is required for a particular time in the output production, that information will be supplied by the correct sub-style.

The role of the music micro-description [1207] will now be described. Referring back to the case, described earlier, where there is no input music, the information passed from styles/sub-styles to the construction logic [1201] is effectively a set of edit commands, and the construction logic attempts to obey these commands if at all possible. (It may not always be possible, as some decisions depend upon the video/images description—see the discussion above about video segment selection—but generally it is possible and where it is, the construction logic will obey the command.)

However, in the case of music-based productions the information which the sub-style passes to the construction logic is a set of preferences: these preferences are to be followed only after the local features of the music, derived from the music micro-description [1207], are considered. The micro-description contains a description of the input music at the timescale of bars, beats and sub-beat. This description can include, or be used to generate, a series of "edit hints". For example, one kind of edit hint, which can be derived directly from a music amplitude descriptor, indicates that it is desirable to produce a segment transition in the output production at a certain time such as on a strong beat of the music.

Once the sub-style sequence has been created, the construction logic [1201] is able to build the MSG as follows, starting from the beginning of the output production and traversing to the end of the output production:

Acquire edit preferences relevant to the current time in the output production from the sub-style corresponding to this time.

Acquire edit hints relevant to the current time in the input music (which is directly related to the current time in the output production) from the music micro-description [1207].

Where required—when making a decision relating to segment selection—acquire descriptor values from the video/images description [1203].

Make edit decisions by combining these inputs and store the edit decisions in the MSG [1205].

The two major aspects of the above will now be described in greater detail by example: first, how a sub-style sequence matched to music macro-structure can be created, and second, a way in which the constructor can combine edit preferences with edit hints to produce edit decisions.

Creating a Sub-Style Sequence Matched to Music Macro-Structure

The general principle used to create a sub-style sequence matched to the music macro-structure is to use descriptor matching, a similar technique to that described in detail above for selecting input video segments by descriptor matching.

Figure 13:
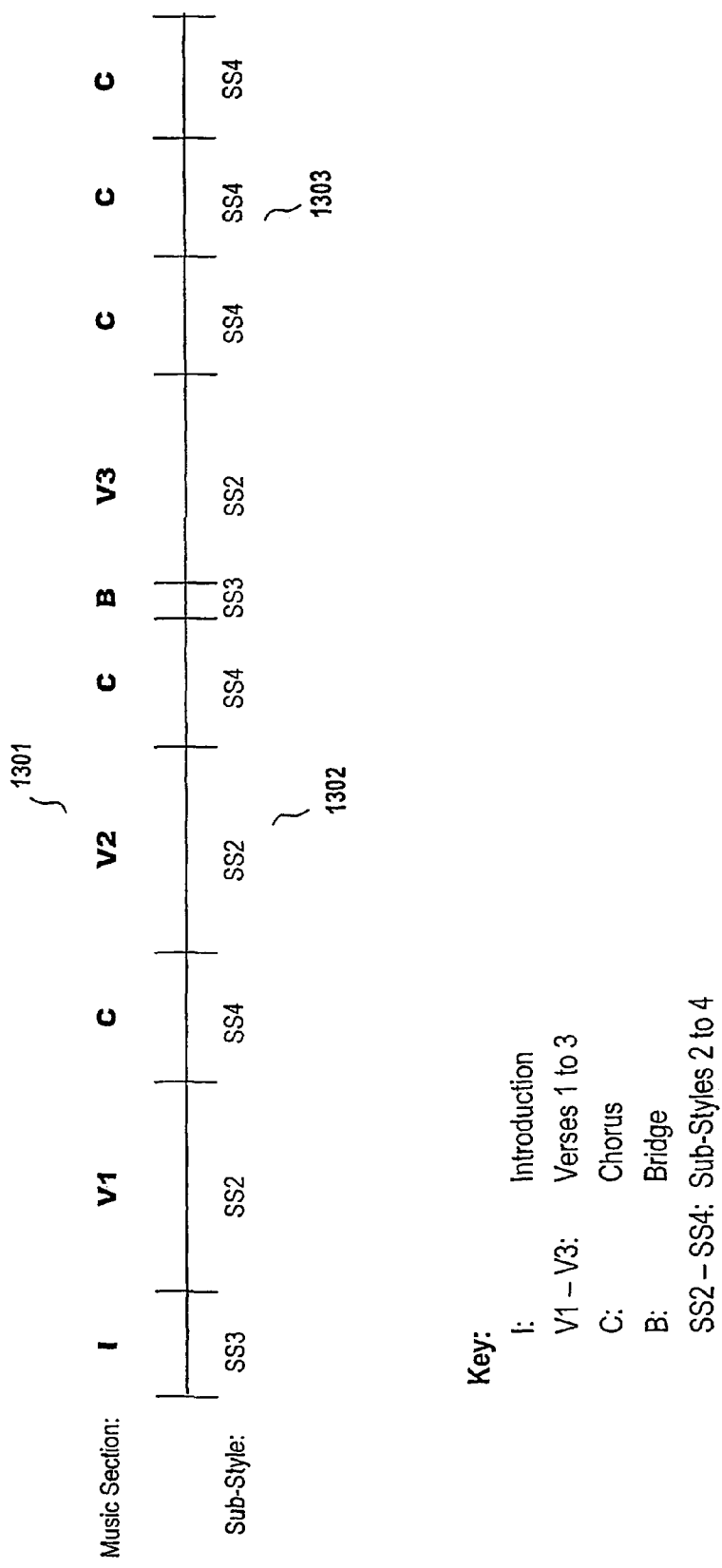
FIG. 13 shows a feature of the embodiment of FIG. 1 in which the sub-style sequence is matched in a one-one correspondence with the macro-structure of a piece of music.

The goal of this process is to produce a sub-style sequence linked to the music structure such as the example shown in FIG. 13. This shows a sequence of music sections [1301] following a structure found in many popular songs: Introduction, Verse 1, Chorus, etc. These are matched in a one-to-one relationship with a set of sub-styles [1302]. The sequence of these sub-styles—SS3, SS2, SS4, etc in this example—is the sub-style sequence.

Before proceeding it is worth noting two features of this example. First, each time the same music or similar music occurs, it is linked to the same sub-style: for example the chorus is always linked to SS4 in this case. This is normally desirable whenever the music sections are very similar, and the procedure about to be described will cause this result in many such cases. Secondly, there is no requirement for all the sub-styles of a particular style to be used: there is no "SS1" in this figure, implying that sub-style 1 has not been selected for this particular piece of music.

Figure 14:
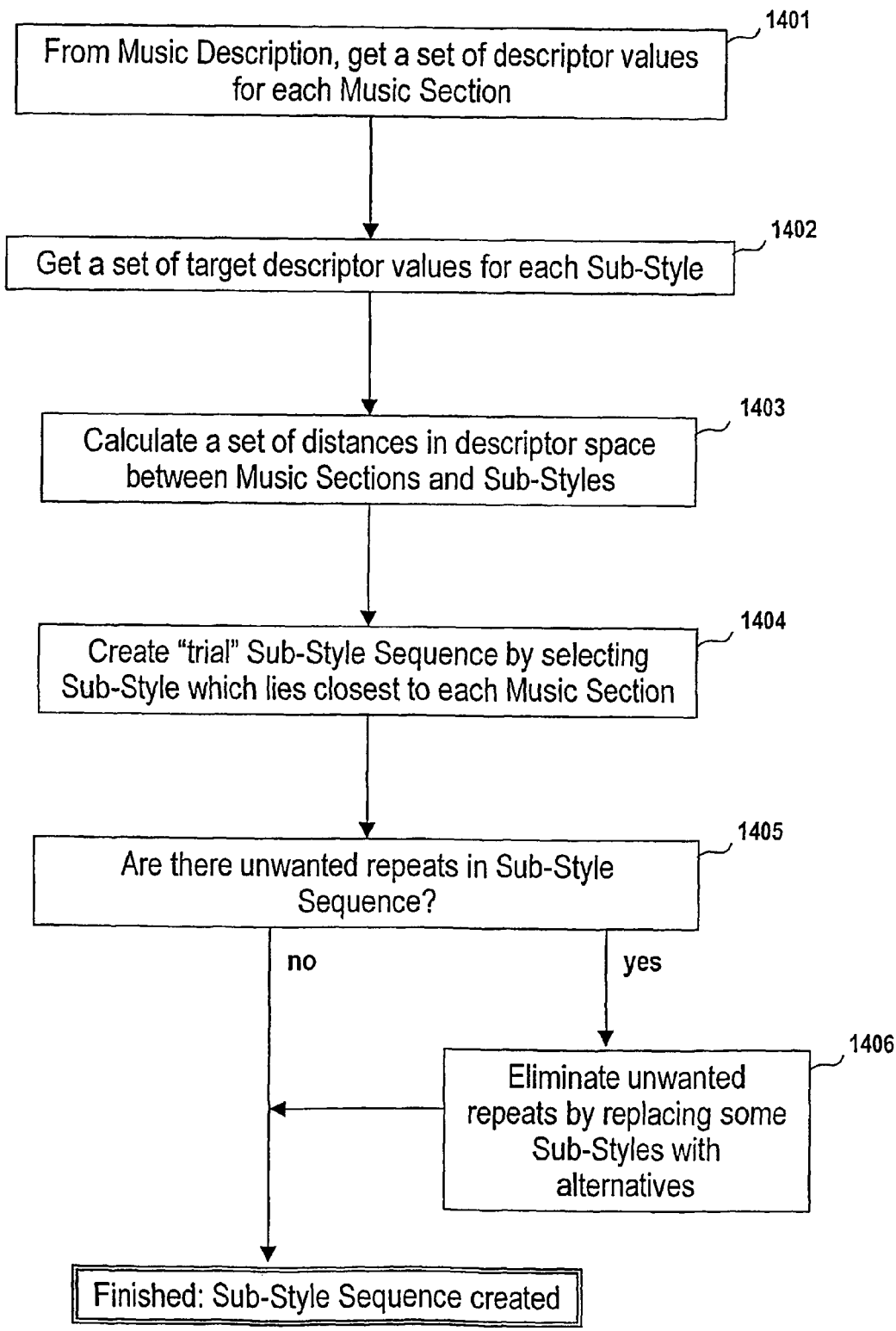
FIG. 14 is a flowchart illustrating one way in the embodiment of FIG. 1 in which a sub-style sequence can be matched automatically to the macro-structure of input music.

FIG. 14 shows one way in which such a sub-style sequence may be derived automatically from the structure of the music. First, a set of descriptor values, one set for each music section, is acquired from the music description [1401]. Suitable descriptors for a music section include the duration of the music section, its average tempo, loudness, and beat-strength. Many other kinds of descriptors can be used, such as those listed earlier, and as mentioned, they may be generated by signal analysis, produced as a by-product of the music production, entered manually or generated by any other means. The only fixed requirement is that the set of descriptors for each music section characterizes some perceptually-significant qualities of the music section.

The next step, [1402] is to retrieve from the style information a set of target descriptor values, one set for each sub-style. The set of target values in a sub-style constitutes a description of the characteristics of music which this sub-style would be particularly well matched to. Typically these are created by the style designer by a manual process of entering a set of target values for each sub-style. For example, when the style designer creates a fast-cut sub-style (i.e. one which contains or generates small values for the preferred segment duration, introduced above), she/he might define that this sub-style is best suited to a music section which exhibits high values for the tempo and beat-strength descriptors, but is not dependent on loudness.

The next step, [1403] is to calculate a set of distances in descriptor space between music sections and sub-styles. This is similar to the process described above for selecting input video segments in a non-sequential case, and the techniques introduced for optimizing the calculation of proximity (see FIG. 7) may also be applied in this case. From the set of distances, a "trial" version of the sub-style sequence can now be created [1404] by assigning the closest sub-style to each music section.

The next step [1405] is to check the sub-style sequence for undesirable repeats. This is necessary because, even if techniques such as descriptor distribution normalization (described above in connection with FIG. 7) are applied, it may happen that the same sub-style gets mapped to too many of the music sections. This is particularly undesirable if the same sub-style gets mapped to two music sections which are consecutive yet different. Note that in the example presented above with reference to FIG. 13, the only consecutive occurrences of the same sub-style are the three occurrences of SS4 [1303] which occur because the Chorus repeats 3 times. This is a desirable case of repetition, but any other repeats in this example would probably be undesirable. Such undesirable repeats can often be detected, for example by checking whether the total number of occurrences of one sub-style exceeds a certain value or the total duration of consecutive repeats exceeds a certain time value.

If such undesirable repeats are found, they are eliminated [1406] by replacing some of the sub-styles in the sub-style sequence with alternatives such as the next-nearest sub-style for each music section found in step [1403] above.

Figure 6:
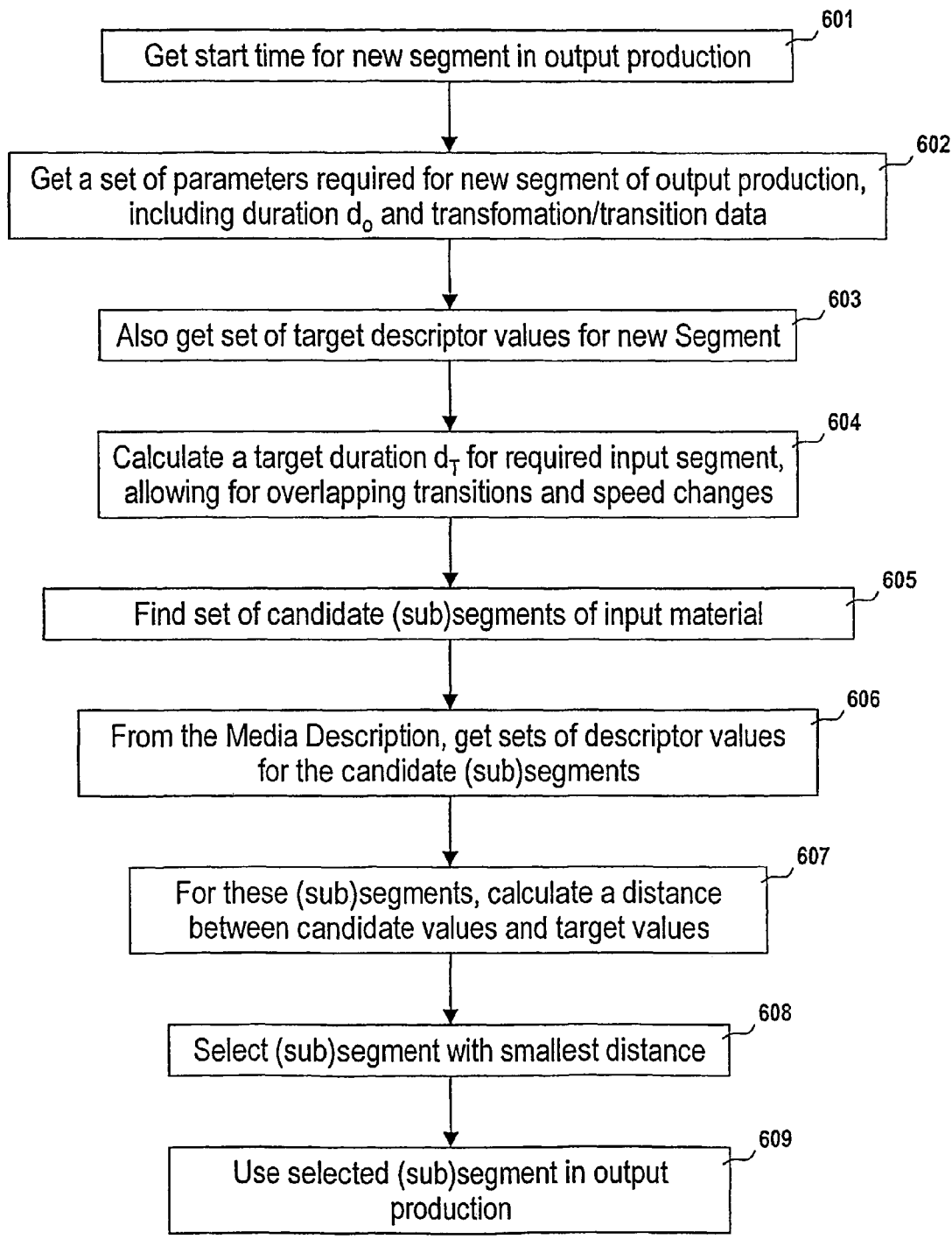
FIG. 6 is a flowchart illustrating logic for selecting a video segment in the example of FIG. 4, such that the output production does not preserve the order of segments found in the input material, but instead selects by similarity of the segment descriptor values.
Figure 7:
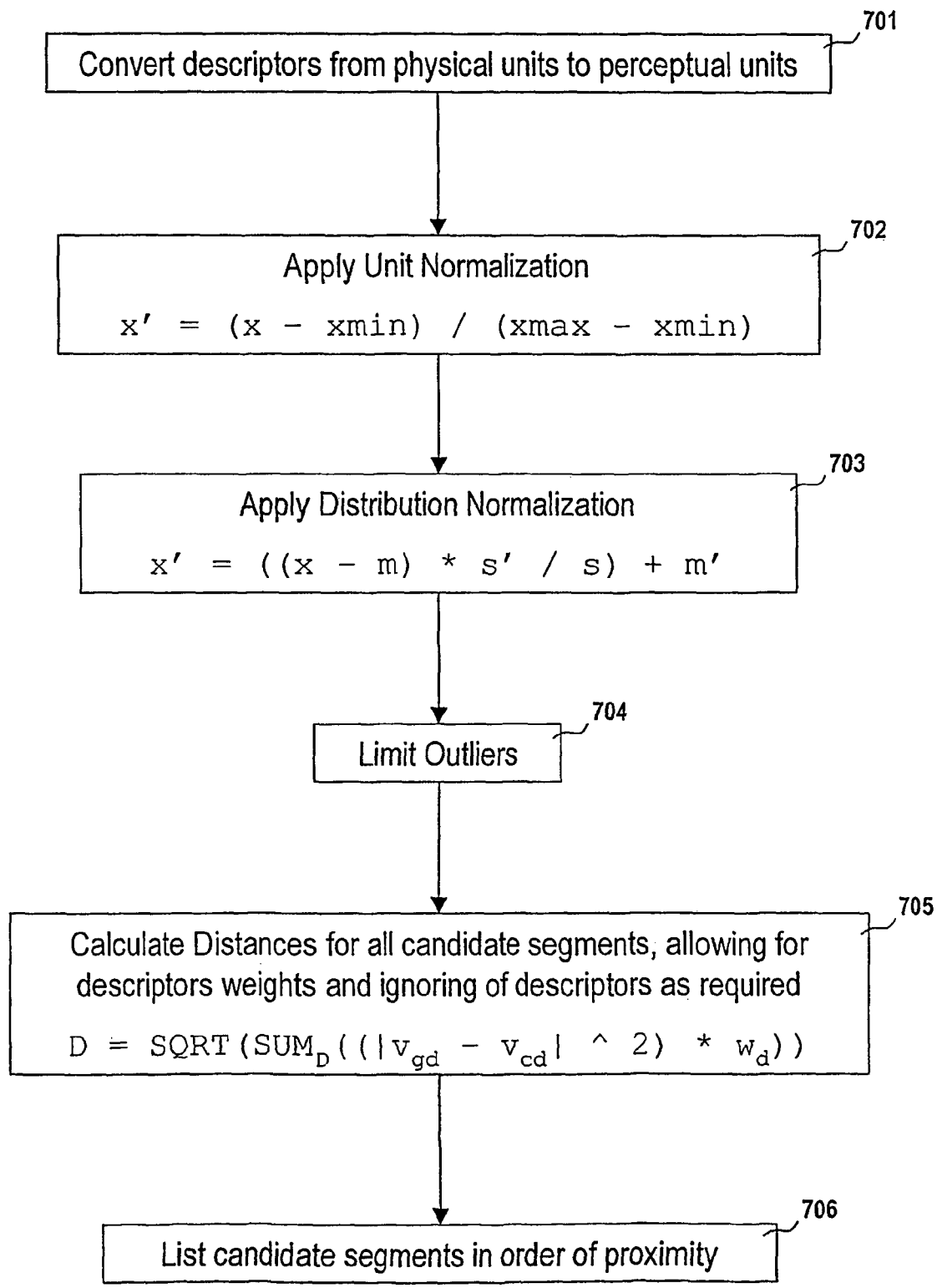
FIG. 7 is a flowchart illustrating logic used by the embodiment of FIG. 1 to calculate a similarity measure between a set of candidate segments and a target set of descriptor values.

Because this technique is similar to the techniques for selecting input video segments described in above with reference to FIGS. 6 and 7, many of the details and alternatives presented above may also be applied here.

Combining Edit Preferences with Edit Hints to Produce Edit Decisions

Figure 15:
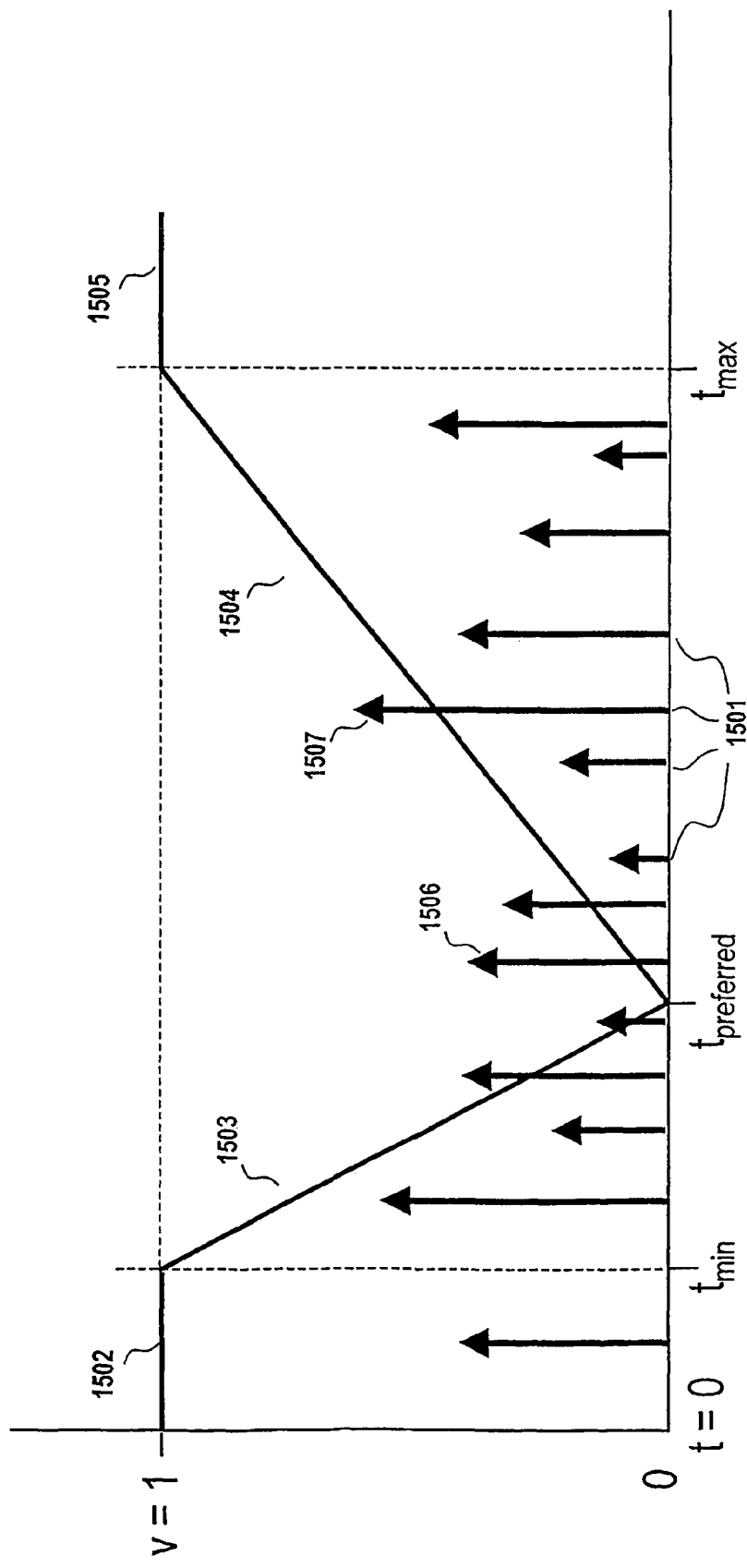
FIG. 15 illustrates a thresholding mechanism for combining edit preferences from style information with edit hints derived from a music description in order to generate edit decisions.

FIG. 15 shows a graphical representation of one technique for combining edit preferences from the style/sub-style information with edit hints from the music micro-description in order to produce edit decisions. This technique operates at the timescale of musical beats. It will be described as a technique for making cut decisions (i.e. identifying time locations in the output production at which there should be a change of segment) but the technique, or variants of it, can be used to make other kinds of edit decision, such as identifying time locations at which to insert flashes or other special effects.

In this example, the horizontal axis is time, and the vertical arrows [1501] are edit hint pulses received or derived from the music micro-description. The height of these arrows is related to a perceptually-significant characteristic of the music and their horizontal location indicates the time at which they occur relative to a start-time t=0. Typically the characteristic in question is one which is closely related to the musical beat, such as a signal derived from the amplitude variations in the audio signal. Many techniques are known in the art for automatically extracting such representations of musical beat: for example, the overall amplitude, or the amplitude of a frequency band within the signal, can be subjected to a threshold-crossing test. Further refinements, such as the use of a phase-locked loop, can synchronize the detection mechanism with the periodicities in amplitude variation which occur when the beat is regular, as it is in most popular music. Whatever technique is used, it is desirable that the edit hint pulses have the following tendencies:

That the majority fall on beats, or on simple fractions of beats such as ½, ¼, ⅓, etc.

That pulses occurring on strong beats, such as the first beat of each bar, have higher values.

That the value of off-beat pulses (those occurring between the main beats) have high values wherever there is a strong off-beat musical event; this is common in much music for example in styles of music known as "syncopated".

That, in general the pulses correspond to the rhythm as it would be perceived by a human listener.

In this case the construction logic will interpret each edit hint pulse as a request to perform a cut at the corresponding time, and the height of each pulse as the strength of the request. The pulse height can be limited to a range such as 0 to 1; this is the case in FIG. 15.

However, the construction logic also has to take account of the style/sub-style information. One parameter specified by styles is the "cutting speed" as introduced earlier. What is relevant to this example is that the style information specifies, for any moment in the output production, a preferred segment duration for the next shot of the output production. This preferred duration is marked $t_{preferred}$ in FIG. 15 and is more generally represented by the four line segments [1502, 1503, 1504 and 1505]. These four segments form a threshold which will be applied to the edit hint pulses. The threshold reaches a minimum at $t_{preferred}$. It also takes the maximum permissible pulse value of 1 for $t<t_{min}$ and for $t>t_{max}$; This means that only pulses lying between $t_{min}$ and $t_{max}$ can cross the threshold.

Two more facts are required to fully understand the operation of this mechanism:

The zero time, t=0, corresponds to the previous cut: i.e. it is the start-time of the current video segment. As the construction logic creates the output production segment by segment, this is reset for every segment.

The selected segment duration is the time, relative to t=0, of the pulse for which the value $v_x=v_p-v_{th}$ is greatest, where $v_p$ is the value of the pulse and $v_{th}$ is the value of the threshold at the time of the pulse. In other words, it is the time of the pulse which exceeds the threshold by the greatest value, or if no pulse crosses the threshold, the pulse which comes closest to it. In FIG. 15 this is pulse [1506]. Note that pulse [1507] has a higher value, but is not used because the value $v_x$ is greater for pulse [1506].

Taking into account all the above factors, it can be seen that this thresholding mechanism exhibits the following behaviors:

It will favor durations which correspond to strong edit hint pulses, in other words it will tend to cause cuts related to the beats and other features of the music as described above.

It will favor pulses which fall near to the preferred segment duration. In particular, if the music is very quiet so that the edit hint pulses are very weak, or the music is relatively featureless so that all the edit hint pulses are of similar strength, it will select a duration very close to $t_{preferred}$.

It will always select durations which lie between $t_{min}$ and $t_{max}$.

By varying the distance between $t_{min}$ and $t_{max}$ it is possible to control the relative influence of the musical rhythm (the edit hint pulses) and the preferred segment duration. If $t_{min}$ and $t_{max}$ are close together, the preferred segment duration will dominate; if they are far apart, the musical rhythm will dominate. This is a factor which can be set differently in different styles, or even in different sub-styles of a single style. Changing the position of $t_{min}$ and $t_{max}$ relative to $t_{preferred}$ allows further control, biasing towards longer or shorter durations when there is no strong pulse close to $t_{preferred}$. Furthermore, variants of the mechanism can use non-linear thresholds, in which the line-segments are replaced by curves, providing even finer control over the behavior.

It is often effective to set the value of $t_{preferred}$ to a duration which is related to the beat speed at the current music tempo, for example, 1 beat, ½ beat, 2 beats, etc. Note also that the constructor often assigns $t_{preferred}$ a different value for each segment as it progresses through the output production, using techniques such as those described earlier for creating variety in edit decisions: the use of sub-styles, gradual evolution, stochastic generation and value cycling.

By combining the set of techniques described in this section, the invention is able to generate edit decisions which are perceived as relating to the rhythm of the music, which are sufficiently varied even if the music is very regular, and which always lie within acceptable limits, regardless of the selected music.

Other Features for Automating the Creation of Music-Based Productions

The invention may optionally be enhanced with several other features for automating or facilitating the creation of music-based productions, for example:

In music-based productions, it is sometimes desirable to mix in the input soundtrack or parts of it. One option is to mix the entire input soundtrack with the input music at relative levels which remain constant. Another option is to vary the level of the input soundtrack or the input music or both, so that one or other is always clearly audible and not obscured by the other; for example this can use a technique known as "ducking" which is well-known to audio professionals and widely used in applications such as live radio to lower the level of music whenever an announcer speaks. Yet another option is to control the presence or absence of additional audio elements according to the value of descriptors in the music description. For example, in a common case where the input music is a song and the input soundtrack contains spoken voices, it will generally create a confusing or muddled effect if the spoken voices are mixed simultaneously with the singing voice, so it is desirable to mix in audio from the input soundtrack only when there is no singing voice, such as in purely-instrumental sections of the music. In cases where the music description includes imported elements (as described above), this can be achieved by the use of manually-created descriptors which indicate the presence or absence of a singing voice. There are also known signal analysis techniques for detecting the presence of a singing voice in music which could incorporated into the music analyzer in order to automate this. A further possibility for controlling the mixing-in of audio from the input soundtrack, which can be used in conjunction with the techniques just described, is to select portions of the soundtrack according to their audio characteristics. For example, speech detection algorithms, which are well-known in the art, can be used to select only portions of the soundtrack in which speaking predominates over other sounds. Conversely, a music-detection algorithm can be used to ensure that sections of the soundtrack which contain music are not selected; this is desirable because music in the soundtrack would generally create an unpleasant effect if mixed with the input music. Although the audio analysis techniques for automating these processes are not completely reliable—for example, no known technique can detect the presence of a singing voice with complete accuracy across all types of music—they nevertheless work well enough to be useful in this invention, especially in embodiments where user touch-up (as described above) is supported.

It has already been described how, in music-based productions, a professional editor will often align video elements so that the timing of significant features, such as the moment a falling object hits the ground is synchronized with the timing of notable features of the music. This can be automated by combining known techniques for video motion analysis with techniques for detecting musical features, such as the beat detection technique introduced above. For example, motion vectors can be extracted from video using standard techniques such as block-matching, and the timing of abrupt decelerations such as collisions can then be established by identifying times when there is an abrupt change in the scalar or vector sum of the motion vectors within a region of the frame. Once the times of one or more of these deceleration moments has been established in a shot of the input video, and the strength of each deceleration established, the shot can be optimally aligned with the music by finding the relative timing between video and music for which there is the best match. This can be defined as the relative time for which the mathematical correlation of deceleration with beat strength, calculated over the duration of a segment of the output production, is at a maximum.

Beat strength and other descriptors derived by the music analyzer can be used to control the animation of text/graphic overlays. For example, parameters of an overlay such as its location, orientation, size, skewing, color, etc can be determined directly by the amplitude of the music signal. Or, in a more sophisticated implementation, representations of musical beat based on a threshold-crossing test (as introduced above) can be used to trigger sudden changes in parameters of an overlay, and the overlay then allowed to relax to its default position rather more slowly. In other words the animation can be based upon a relaxation model which is excited by pulses derived from the music signal and related to the musical beat. Furthermore, the music section descriptors introduced above can be used to control changes in the animation behavior which is aligned with the section boundaries and is related to the musical characteristics of each section; for example the color, size and relaxation speed of an overlaid text/graphic animated as above could be made proportional to the average loudness of the current music section, so that overlays occurring during loud music will be large, bright and move in a jerky manner, while overlays occurring during quiet music will be small, dark and move more flowingly.

Changes to the Production Workflow

Figure 16:
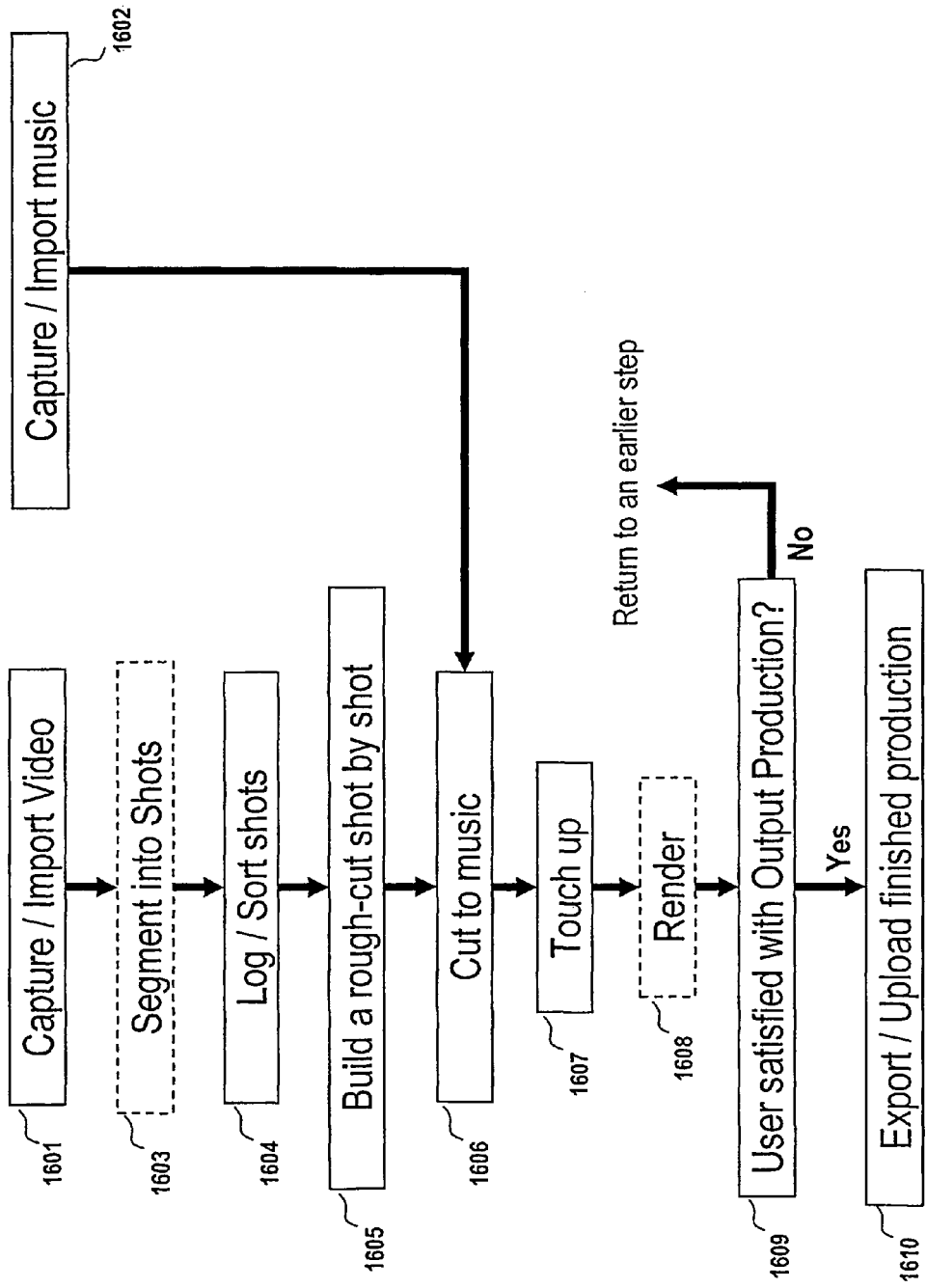
FIG. 16 shows a typical workflow for a user creating a video production using a conventional non-linear video editor.

This final section describes how a typical embodiment of the invention changes the workflow for a user engaged in creating a media production, with reference to FIGS. 16 and 17. In these two figures, steps shown with dashed borders are ones which are typically automated or assisted by automation.

FIG. 16 shows the workflow in a typical conventional case, using a tool such as a Non-Linear Video Editor (NLE) to create a music-based output production from input video. First, the input video is captured and/or imported [1601]. This typically involves recording video using a camera attached to a computer, or transferring video material recorded earlier from a video camcorder to a computer, or acquiring video in the form of a digital video file. If an analogue recording device, such as an analogue camcorder, is used this step also involves digitizing the input signal. In any of these alternative scenarios, when this step is complete, the input video material has been introduced into the NLE.

As this example concerns a music-based production, the user also has to capture/import music [1602], for example by recording it, or transferring it from a musical medium such as an audio CD, or acquiring music as a digital audio file. In any of these alternative scenarios, when this step is complete, the input music has been introduced into the NLE.

Some NLE's are able to perform the next step [1603] automatically, segmenting the input video into shots using techniques such as detecting sudden changes in color histogram. The shots are presented to the user, typically as a set of "clips", i.e. small segments of input video. If the NLE does not include automatic shot segmentation, the user segments the input video manually.

Next the user needs to familiarize herself/himself with the shots of the input video. This is typically done by "logging" the shots [1604]—i.e. organizing them in groups or in certain orders, making notes about each shot, rejecting some shots, etc. For professional productions involving a lot of input material this is usually a lengthy task. For small casual productions it may largely be bypassed, although doing so is usually detrimental to the quality of the resulting production.

The next three steps [1605, 1606, 1607] may be performed sequentially, or the user may alternate between them (for example finishing one section of the output production before moving on to the next section) or the user may work in a way which blurs the distinction between them. Whichever approach he/she adopts, the user must build the output production manually segment by segment, and—if a stylish music-based production is the goal—must carefully manipulate the segments so that they conform to the rhythm, timing and "feel" of the input music. This involves many of the techniques described above and is very time-taking in most cases, often requiring an hour, or several hours, to create each minute of the output production. It is also beyond the skill of many non-professional users to create a output production to a quality standard that they are happy with, particularly in the case of music-based productions, which require an understanding of music as well as visual material.

When the user believes that he/she has arrived at a satisfactory set of edit decisions, he/she instructs the NLE to render [1608], at which point it produces an output production as a video file or other output. The user views this and, if not satisfied [1609], returns to one of the earlier steps to alter or refine the production.

Finally the user exports their output production in a form which allows them, and others to view it [1610]. In the most basic case they may simply use the video file on their computer for local viewing, but more commonly they will transfer it to tape using a video cassette recorder, or to an optical disk format such as writeable compact disc (CD-R). It is also becoming increasingly common to distribute the video file using the Internet, for example by sending it as an email attachment, uploading it to a server which others can access, or sharing it from the user's local machine using so-called "peer-to-peer" file sharing.

FIG. 17 shows the workflow in a typical music-based production case using a system based upon an embodiment of the current invention, and should be contrasted with the conventional workflow just described with reference to FIG. 16.

The capture/import steps [1701 and 1702] are the same as the corresponding steps [1601 and 1602] described above for the conventional NLE case. The shot segmentation step [1703] is also essentially the same as the correspond step in the above [1603]. The system uses one or more known techniques to automate the segmentation, and may optionally allow the user to override or adjust the resulting segmentation.

Next the user pre-selects content (elements of the input material) and/or treatment of the material [1704]. The invention provides techniques for assisting this process as described earlier. This step is optional and may be bypassed in some embodiments.

The next step [1705] comprises the many kinds of automatic analysis and construction which have been extensively described in this document. Once this step is finished, a complete set of edit decisions has been generated—these fully define an output production. Typically this step is performed fully automatically by the system and requires no help from the user.

The system now renders the output production [1706]. The user views this and, if not satisfied [1709], may either touch up the production with assistance from the system based upon the techniques described earlier [1707], or may return to any of the earlier steps.

Finally the user exports their output production [1710]. This step is similar to the corresponding step [1610] described above for the conventional NLE case.

It can be seen from FIGS. 16 and 17 plus the above description that the workflow for a typical embodiment of the current invention involves more automation and less manual work by the user. This speeds up the production process, reduces the amount of the user's time involved in it, and provides greater support for inexperienced users.

Hardware Embodiments

It will be clear to those skilled in the art that the invention can be embodied in many kinds of hardware device, including general-purpose computers, personal digital assistants, dedicated video-editing boxes, set-top boxes, digital video recorders, televisions, computer games consoles, digital still cameras, digital video cameras and other devices capable of media processing. It can also be embodied as a system comprising multiple devices, in which different parts of its functionality are embedded within more than one hardware device.

Although the invention has been described above with reference to particular embodiments, various modifications are possible within the scope of the invention as will be clear to a skilled person.

The invention claimed is:

1. A computer-implemented method of constructing output data constituting a music-based audiovisual media production for display on an audiovisual display device, from input data including both visual media and musical media, the method including the steps of:
   (a) performing signal analysis upon the musical media to generate a series of music descriptor values, said signal analysis being performed upon the musical media at a micro timescale including beats and sub-beats, each of the music descriptor values indicating the presence of a perceptually-significant characteristic of the musical media at a corresponding time in the music, said music descriptor values including edit hints, each edit hint corresponding to a certain time in the input music data, said edit hints including edit hints corresponding to respective times between said beats;
   (b) receiving from a user an input indicative of the values of a set of editing parameters;
   (c) defining segments of the visual media according to said series of music descriptor values and said set of editing parameters; and
   (d) concatenating a plurality of said segments of the visual media.

2. A method according to claim 1, further including a pre-selection step wherein elements of said input data are manually identified and selected by a user for one or more of the following actions:

compulsory inclusion in the output data;
optional inclusion in the output data;
compulsory exclusion from the output data.

3. A method according to claim 1, further including a step wherein said output data is subjected to manual editing comprising one or more of the following treatments:
replacing a selected portion of the visual media within a segment of said output data with an alternative portion; and
overlaying text or graphics upon said output data.

4. A method according to claim 1 including a step of supplementing the at least one music descriptor value with additional pre-generated descriptors received from an external source, said additional descriptors being used in a step of generating a set of editing decisions for constructing the output data from the input data.

5. A method according to claim 4 wherein said additional descriptors include descriptors generated by instrumentation at a time of recording the input data.

6. A method according to claim 4 wherein said additional descriptors include descriptors generated manually.

7. A method according to claim 4 wherein said additional descriptors include music descriptors generated during music production.

8. A method according to claim 1 in which the method includes applying transformation operations that include modification of the color of one or more parts of an image defined by said input visual media.

9. A method according to claim 1 wherein the method includes applying transformation operations that include modification of the playback speed of one or more parts of said input data.

10. A method according to claim 1 in which in said step of concatenating the plurality of segments, the plurality of segments are concatenated with neighboring segments partially overlapping, and in which the method includes applying combination operations that include video transitions.

11. A method according to claim 1 in which said editing parameters include one or more target values for respective descriptors associated with the visual media, and the method includes selecting, for inclusion in the output data, one of more of the plurality of segments of said input data according to a calculation the proximity of a) said target value or values and b) the descriptors for each said segment.

12. A method according to claim 11 in which the descriptors include visual descriptor values, each value representing a measure of a visual properly of a respective segment of the input data, wherein the method includes:
setting a respective visual descriptor target value for at least one visual property of each of a plurality of temporal segments of the media production; and
selecting, for each temporal segment of the media production, of the portions of the input data for inclusion in the segment based on a calculation of the closeness of the value to the target value for the segment.

13. A method according to claim 1 in which the order of the selected segments of the visual media is equal to, or at least correlated with, the order of these segments within the input data whereby the output data comprises a summary of the input data in which the original sequence is preserved.

14. A method according to claim 1 in which said input indicates said set of editing parameters by specifying one of a plurality of pre-defined sets of editing parameter values.

15. A method according to claim 14 in which said set of editing parameters is composed of two or more sub-sets of editing parameters each sub-set being associated with a respective plurality of the segments, whereby variation is introduced into an editing style of said output data.

16. A method according to claim 15 in which said sub-sets of the editing parameters include target music descriptor values, and are associated with sections of said visual media by matching said generated music descriptor values to said target descriptor values, whereby variations in an editing style of said output data are synchronized with variations in said music data.

17. A method according to claim 1 in which said editing parameters include preferred segment duration information, the preferred segment duration information is varied periodically with temporal location in the output data, whereby a pattern of cyclic variation is introduced into an editing style of said output data.

18. A method according to claim 1 in which at least some random variation is introduced into the setting of preferred segment durations whereby variation is introduced into said editing decisions.

19. A method according to claim 1, further including receiving from a user a manual input identifying one or more portions of said input data for inclusion in the output data and specifying, for each of said portions, one or more aspects of transitions and effects to be applied to said input data in order to generate said output data.

20. A method according to claim 3 in which segments of the output data are manually replaced with alternative segments generated from said input data, further comprising using descriptors associated with the visual media to suggest to a user of the input data resembling or contrasting with portions in the segments to be replaced, whereby the user is assisted in the process of manually replacing segments.

21. A method according to claim 3 in which, following said generation of said descriptors, said descriptors are stored, said manual replacement step employing said stored descriptors.

22. A method according to claim 1 in which, subsequent to generating output data, said output data may be progressively refined by recursively applying the following steps:
viewing said output data,
indicating parts of said output data for which further modification is prevented, and
generating a new version of said output data in which parts which have not been thus identified are re-generated in a modified form.

23. A method according to claim 22 in which, following said generation of said descriptors, said descriptors are stored, said step of generating a new version of the output data employing said stored descriptors.

24. A method according to claim 12 in which the visual descriptor values include a human-probability descriptor value for each of a plurality of the portions of the input data, the human-probability descriptor value representing a probability that a human being is present in the respective portion of said input data, wherein portions of the input data for which the human-probability descriptor value is high are more frequently incorporated into the output data than portions for which the human-probability descriptor value is low.

25. A method according to claim 24 in which said human-probability descriptor value is a face probability descriptor value representing a probability that a human face is present in each portion of said input data.

26. A method according to claim 12 in which said visual descriptor values include at least one camera motion descriptor value for each of a plurality of moving image portions of the input data which represent moving image data, the camera-motion descriptor value representing for each respective element a degree to which the camera which collected that portion was moving when that portion was collected, wherein portions of the input data for which the camera motion descriptor value is low are more frequently incorporated into the output data than portions for which the camera motion descriptor value is high.

27. A method according to claim 1 in which said output data includes at least one overlay, said overlay comprising at least one of text and graphics.

28. A method according to claim 27 in which an overlay is animated.

29. A method according to claim 28 in which the animation of said overlay is determined by the music descriptor value.

30. A method according claim 1 which is performed by a distributed system and each of at least two steps of the method is performed at a different respective location.

31. A method according to claim 1 which is performed by a distributed system and in which step (a) is performed at one location and the remaining steps are performed at a different location.

32. A method according to claim 1 which is performed by a distributed system and:
  steps (a) to (d) are performed at a first location operated by a first user;
  resulting information representing the media production is transmitted to a second location operated by a second user, the second user having access to the input data or a copy thereof; and
  step (e) is performed at the second location operated by the second user;
  whereby the second user may view a media production created by the first user without the need to transmit the input data from said first user to said second user.

33. A method according to claim 1 in which at least some of the music descriptor values have a value indicative of the strength of the perceptually-characteristic feature of the music at the corresponding time.

34. A method according to claim 1 in which the music descriptor values are related to the timing of musical beats or other prominent musical events, the music descriptor values being used to modify the duration of segments to synchronize transitions or cuts between said concatenated segments with said musical beats or other prominent musical events.

35. A method according to claim 34 in which the modification of the segment duration is determined by applying a time-dependent threshold to the at least one music descriptor value.

36. A method according to claim 1 in which the music descriptor values are related to the timing of musical beats or other prominent musical events in said musical media and the method includes including the generation of flashes.

37. A method according to claim 1 in which
  further comprising generating motion descriptors from the visual media, and
  said musical event descriptor values and said motion descriptors are used to control the timing of segments of visual media in said audiovisual production such that prominent visual events are synchronized with prominent features of the music.

38. A method according to claim 1 in which the input data includes a soundtrack associated with motion video, and the method mixes parts of said soundtrack with the musical media in accordance with at least one of:
  selecting said parts of soundtrack according to their audio characteristics,
  determining when to mix in said parts of soundtrack according to the value of music descriptors, and
  lowering the volume of said music media when said parts of soundtrack are mixed in.

39. A method according to claim 1 and further including the step of establishing a user interface having two or more of the following controls:
  a control allowing a user to select visual media,
  a control allowing a user to select musical media,
  a control allowing a user to add text data,
  a control allowing a user to select or define said editing parameters, and
  a control which causes the output data to be created.

40. A method according to claim 1 including the step of displaying a graphical user interface including visual thumbnails.

41. A recording medium carrying program instructions which are readable by a computer and which cause the computer to perform a method according to claim 1.

42. A computer system comprising a processor and a data storage device,
  the data storage device storing program instructions operable by the processor to construct output data constituting a music-based audiovisual media production for display on an audiovisual display device from input data including both visual media and musical media, by performing the steps of:
  (a) performing signal analysis upon the musical media to generate a series of music descriptor values, said signal analysis being performed upon the musical media at a micro timescale including beats and sub-beats, each of the music descriptor values indicating the presence of a perceptually-significant characteristic of the musical media at a corresponding time in the music, said music descriptor values including edit hints, each edit hint corresponding to a certain time in the input music data, said edit hints including edit hints corresponding to respective times between said beats;
  (b) receiving from a user an input indicative of the values of a set of editing parameters;
  (c) defining segments of the visual media according to said series of music descriptor values and said set of editing parameters; and
  (d) concatenating a plurality of said segments of the visual media.

43. A computer-implemented method for editing input data including input visual data and input music data to form a music-based audiovisual media production for display on an audiovisual display device and including output visual data, the method including the steps of:
  analyzing the input music data to derive one or more descriptors including music descriptors, said music descriptors characterizing each of a plurality of portions of the input music data at a micro timescale including beats and sub-beats;
  defining edit preferences for controlling the editing of the input data;
  using said descriptors and said edit preferences to generate a set of editing decisions, the set of editing decisions specifying a set of editing operations to be performed on said input data; and
  generating said music-based audiovisual media production by performing said set of operations upon said input data;
  wherein said music descriptors include edit hints, each hint corresponding to a certain time in the input music data and indicating a perceptually-significant characteristic of a portion of the input music data, said edit hints including edit hints corresponding to respective times between said beats.

* * * * *